(12) United States Patent
Wang et al.

(10) Patent No.: US 11,575,908 B2
(45) Date of Patent: Feb. 7, 2023

(54) METHOD AND APPARATUS OF HISTORY-BASED INTRA MODE CODING

(71) Applicant: HUAWEI TECHNOLOGIES CO., LTD., Shenzhen (CN)

(72) Inventors: Biao Wang, Shenzhen (CN); Semih Esenlik, Munich (DE); Anand Meher Kotra, Munich (DE); Han Gao, Munich (DE); Jianle Chen, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 17/170,028

(22) Filed: Feb. 8, 2021

(65) Prior Publication Data

US 2021/0185326 A1 Jun. 17, 2021

Related U.S. Application Data

(63) Continuation of application No. PCT/CN2019/099607, filed on Aug. 7, 2019.

(60) Provisional application No. 62/716,964, filed on Aug. 9, 2018.

(51) Int. Cl.
*H04N 19/159* (2014.01)
*H04N 19/105* (2014.01)
*H04N 19/176* (2014.01)

(52) U.S. Cl.
CPC ......... *H04N 19/159* (2014.11); *H04N 19/105* (2014.11); *H04N 19/176* (2014.11)

(58) Field of Classification Search
CPC .................................................. H04N 19/159
See application file for complete search history.

(56) References Cited

U.S. PATENT DOCUMENTS

| | | | | |
|---|---|---|---|---|
| 2012/0328009 | A1* | 12/2012 | Sasai | H04N 19/197 |
| | | | | 375/E7.243 |
| 2013/0022119 | A1* | 1/2013 | Chien | H04N 19/51 |
| | | | | 375/E7.123 |
| 2016/0373743 | A1* | 12/2016 | Zhao | H04N 19/593 |
| 2019/0028702 | A1* | 1/2019 | Yu | H04N 19/423 |
| 2019/0230349 | A1* | 7/2019 | Mao | H04N 19/176 |
| 2020/0029092 | A1* | 1/2020 | Rath | H04N 19/13 |

(Continued)

FOREIGN PATENT DOCUMENTS

| | | |
|---|---|---|
| CN | 102857750 A | 1/2013 |
| CN | 103688541 A | 3/2014 |

(Continued)

OTHER PUBLICATIONS

Chinese Office Action issued in corresponding Chinese Application No. 201980051288.6, dated Feb. 7, 2022, pp. 1-5.

(Continued)

*Primary Examiner* — Irfan Habib
(74) *Attorney, Agent, or Firm* — Hauptman Ham, LLP

(57) ABSTRACT

A method to derive candidate intra prediction modes, comprising: recording an intra prediction mode of at least one previous coding unit, wherein the previous coding unit is not adjacent to a to-be-processed coding unit; adding at least one recorded intra prediction mode into a set of candidate intra prediction modes, when the number of the candidate intra prediction modes is less than a preset threshold.

18 Claims, 13 Drawing Sheets

(56) References Cited

U.S. PATENT DOCUMENTS

| | | | |
|---|---|---|---|
| 2021/0274163 A1* | 9/2021 | Li | H04N 19/132 |
| 2022/0124309 A1* | 4/2022 | Heo | H04N 19/593 |
| 2022/0132102 A1* | 4/2022 | Heo | H04N 19/46 |
| 2022/0174316 A1* | 6/2022 | Choi | H04N 19/159 |

FOREIGN PATENT DOCUMENTS

| | | |
|---|---|---|
| CN | 107197282 A | 9/2017 |
| CN | 107483932 A | 12/2017 |
| EP | 2391130 A2 | 11/2011 |
| EP | 3301914 A1 | 4/2018 |
| WO | 2008004837 A1 | 1/2008 |
| WO | 2008004867 A1 | 1/2008 |
| WO | 2013085282 A1 | 6/2013 |

OTHER PUBLICATIONS

Chinese Office Action issued in corresponding Chinese Application No. 201980051288.6, dated Sep. 13, 2021, pp. 1-7.

Extended European Search Report issued in corresponding European Application No. 19846349.9, dated Jul. 1, 2021, pp. 1-7.

Jianle Chen et al., Algorithm Description of Joint Exploration Test Model 7 (JEM 7). Joint Video Exploration Team (JVET) of ITU-T SG 16 WP 3 and ISO/IEC JTC 1/SC 29/WG 11, 7th Meeting: Torino, IT, 13 Jul. 21, 2017, JVET-G1001-v1, 50 pages.

Anand Meher Kotra et al., CE3 3.2.2: Intra mode signaling with priority based MPM and non-MPM list construction. Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0365, 5 pages.

International Search Report and Written Opinion issued in corresponding International Application No. PCT/CN2019/099607, dated Oct. 30, 2019, pp. 1-10, National Intellectual Property Administration, Beijing, China.

* cited by examiner

METHOD AND APPARATUS OF HISTORY-BASED INTRA MODE CODING

CROSS-REFERENCE TO RELATED APPLICATIONS

This application is a continuation of International Application No. PCT/CN2019/099607, filed on Aug. 7, 2019, which claims priorities to U.S. provisional application No. 62/716,964, filed on Aug. 9, 2018, All of the afore-mentioned patent applications are hereby incorporated by reference in their entireties.

TECHNICAL FIELD

The present disclosure relates to the technical field of image and/or video coding and decoding, and in particular to a method and an apparatus for intra prediction.

BACKGROUND

Digital video has been widely used since the introduction of DVD-discs. Before transmission the video is encoded and transmitted using a transmission medium. The viewer receives the video and uses a viewing device to decode and display the video. Over the years the quality of video has improved, for example, because of higher resolutions, color depths and frame rates. This has lead into larger data streams that are nowadays commonly transported over internet and mobile communication networks.

Higher resolution videos, however, typically require more bandwidth as they have more information. In order to reduce bandwidth requirements video coding standards involving compression of the video have been introduced. When the video is encoded the bandwidth requirements (or corresponding memory requirements in case of storage) are reduced. Often this reduction comes at the cost of quality. Thus, the video coding standards try to find a balance between bandwidth requirements and quality.

The High Efficiency Video Coding (HEVC) is an example of a video coding standard that is commonly known to persons skilled in the art. In HEVC, to split a coding unit (CU) into prediction units (PU) or transform units (TUs). The Versatile Video Coding (VVC) next generation standard is the most recent joint video project of the ITU-T Video Coding Experts Group (VCEG) and the ISO/IEC Moving Picture Experts Group (MPEG) standardization organizations, working together in a partnership known as the Joint Video Exploration Team (JVET). VVC is also referred to as ITU-T H.266/VVC (Versatile Video Coding) standard. In VVC, it removes the concepts of multiple partition types, i.e. it removes the separation of the CU, PU and TU concepts except as needed for CUs that have a size too large for the maximum transform length, and supports more flexibility for CU partition shapes.

Processing of these coding units (CUs) (also referred to as blocks) depend on their size, spatial position and a coding mode specified by an encoder. Coding modes can be classified into two groups according to the type of prediction: intra- and inter-prediction modes. Intra prediction modes use samples of the same picture (also referred to as frame or image) to generate reference samples to calculate the prediction values for the samples of the block being reconstructed. Intra prediction is also referred to as spatial prediction. Inter-prediction modes are designed for temporal prediction and uses reference samples of previous or next pictures to predict samples of the block of the current picture.

SUMMARY

Embodiments of the present application provide apparatuses and methods for deriving intra prediction modes according to the independent claims.

The foregoing and other objects are achieved by the subject matter of the independent claims. Further implementation forms are apparent from the dependent claims, the description and the figures.

According to a first aspect the invention relates to a method to derive candidate intra prediction modes, comprising recording an intra prediction mode of at least one previous coding unit, wherein the previous coding unit is not adjacent to a to-be-processed coding unit, adding at least one recorded intra prediction mode into a set of candidate intra prediction modes, when the number of the candidate intra prediction modes is less than a preset threshold.

By using modes that are not directly adjacent to the current coding unit in addition to the modes of adjacent coding units and standard modes that are not defined by previously processed coding units, a more accurate prediction may be achieved. For instance, if one or more adjacent coding unis are not available, or do not provide good predictions for other reasons, the next (not adjacent) coding units may help to provide better predictions.

According to a second aspect the invention relates to a method according to the method of the first aspect, wherein the set of candidate intra prediction modes is a most probable mode list.

Using the improved prediction quality that may be achieved by using second tier neighbors may improve the quality of an MPM list. Such an MPM list may lead to a more efficient entropy coding of the predicted modes as the coding of the modes in an MPM list may be more efficient when the order of the MPM list is improved such that the highest entries in the MPM list are more likely to represent the correct intra mode. This may reduce the traffic needed to transfer images or videos.

According to a third aspect the invention relates to a method according to the method of the first aspect, wherein the set of candidate intra prediction modes includes intra prediction modes that aren't included in a most probable mode list. As the modes that are not included in the MPM list may be split into further groups, based on their probability to represent the mode of the current coding unit, it may still be advantageous to improve the prediction such that the modes with a higher probability to represent the current mode are further up in a list of predicted modes.

According to a fourth aspect the invention relates to a method according to the method of any of the first to third aspect, wherein recording an intra prediction mode of at least one previous coding unit comprises adding the intra prediction mode of at least one previous coding unit into a historical table according to the processing order of the previous coding units. A historical table with an improved prediction quality may help to create more accurate MPM lists and more accurate further mode lists. This may reduce the traffic needed to transfer images or videos.

According to a fifth aspect the invention relates to a method according to the method of the fourth aspect, wherein the historical table is a first-in-first-out table. A first-in-first-out table may be an efficient way to produce a sorted table with the modes having the highest probability to represent the current mode being further up in the table while also being computationally efficient.

According to a sixth aspect the invention relates to a method according to the method of the fourth aspect or according to the method of the fifth aspect, wherein any two entries in the historical table are different. This may improve the entropy coding and reduce the required traffic as the number of different modes in a fixed-length list is increased by avoiding that an entry is inserted multiple times.

According to a seventh aspect the invention relates to a method according to the method of the fourth aspect or according to the method of the sixth aspect wherein the position of an entry in the historical table depends on a frequency of the entry, and adding the intra prediction mode of at least one previous coding unit into the historical table, comprises checking whether the intra prediction mode is in the historical table, and adding the frequency of the intra prediction mode by one, when the intra prediction mode is in the historical table, and adjusting the position of the intra prediction mode, when the frequency of the intra prediction mode is higher than both of the frequencies of the intra prediction modes on adjacent positions, and checking whether the historical table is full, when the intra prediction mode is not in the historical table, and adding the intra prediction mode after the least frequency position of the historical table and setting the frequency of the intra prediction mode as one, when the historical table is not full, and replacing the entry on the least frequency position of the historical table with the intra prediction mode and setting the frequency of the intra prediction mode as one, when the historical table is full.

This may improve the quality of the historical table even more as the modes are actively sorted according to the number of their occurrences, which may be a good indicator for their probability to predict the correct mode of the current coding unit.

According to an eighth aspect the invention relates to a method according to the method of any of the first to seventh aspect wherein adding at least one recorded intra prediction mode into the set of candidate intra prediction modes comprises adding at least one recorded intra prediction mode after the intra prediction mode of at least one adjacent coding unit of the to-be-processed coding unit so that a bit for coding indicator of the intra prediction mode of at least one adjacent coding unit is not more than the bit for coding indicator of the at least one recorded intra prediction mode. Adding at least one recorded intra prediction mode after adding the intra prediction mode of adjacent coding units may improve the quality of the predicted modes set as the adjacent coding units may be not correlated with the current coding unit, instead, the recorded intra prediction mode may be more correlated with the current coding unit.

According to a ninth aspect the invention relates to a method according to the method of the seventh aspect wherein, in the adjusting, the position of the intra mode in the historical table and the adjacent entry is exchanged. This may improve the quality of the predicted modes set as modes with a higher probability to represent the mode of the current coding unit may be more likely to be added to the set several times and thus.

According to a tenth aspect the invention relates to a method according to the method of the second aspect or according to the methods of any of the fourth to ninth aspect wherein for coding of the modes from the MPM list, a truncated unary binarization is used. As the MPM list may be ordered such that the first entry is much more likely to represent the mode of the current coding unit, using truncated unary binarization may reduce traffic when transmitting the code for the mode that is actually selected to predict the current coding unit.

According to an eleventh aspect the invention relates to a method according to the method of any of the third to ninth aspect wherein the candidate intra prediction modes that aren't included in a most probable mode list are first divided into a selected modes set and a non-selected modes set, and the modes in the selected modes list are signaled with a fixed-length code and the modes in the non-selected modes set are signaled with a truncated binary code.

Using different coding for several lists with the remaining modes may further reduce traffic when transmitting the code for the mode that is actually selected to predict the current coding unit.

According to a twelfth aspect the invention relates to a method for encoding a current block of a picture comprising the steps of providing a predicted block for the current block including the method for deriving candidate intra prediction modes according to the method of any of the first to eleventh aspect for the samples of the current block and encoding the current block on the basis of the predicted block. Using the improved methods for deriving candidate intra prediction modes in encoding of a block may improve the computational efficiency and/or reduce traffic for transmitting the picture. To define the mode of the predicted block out of the set of candidate intra predictions, the position of the predicted mode in the set of candidate modes may be signaled.

According to a thirteenth aspect the invention relates to a method for decoding a current block of a picture comprising the steps of providing a predicted block for the current block including the method for deriving candidate intra prediction modes according to the method of any of the first to eleventh aspect for the samples of the current block and reconstructing the current block on the basis of the predicted block. Using the improved methods for deriving candidate intra prediction modes in decoding of a block may improve the computational efficiency and/or reduce traffic for transmitting the picture.

According to a fourteenth aspect the invention relates to a candidate list device for deriving candidate intra prediction modes, comprising processing circuitry configured to record an intra prediction mode of at least one previous coding unit, wherein the previous coding unit is not adjacent to a to-be-processed coding unit, and add at least one recorded intra prediction mode into a set of candidate intra prediction modes, when the number of the candidate intra prediction modes is less than a preset threshold.

By using modes that are not directly adjacent to the current coding unit in addition to the modes of adjacent coding units and standard modes that are not defined by previously processed coding units, a more accurate prediction may be achieved. For instance, if one or more adjacent coding unis are not available, or do not provide good predictions for other reasons, the next (not adjacent) coding units may help to provide better predictions.

According to a fifteenth aspect the invention relates to a decoding apparatus for decoding the current encoded block of a picture, comprising the candidate list device according to the fourteenth aspect for deriving candidate intra prediction modes, and circuitry configured to provide the predicted block for the encoded block using the derived intra prediction modes, and reconstruct the current block on the basis of the encoded block and the predicted block. Using an improved The method according to the first aspect of the invention can be performed by the apparatus according to the fourteenth aspect of the invention.

In other aspects, the apparatus according to the fourteenth aspect can further be configured to perform the methods according to the first to eleventh aspect.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

DETAILED DESCRIPTION OF THE EMBODIMENTS

Figure 1:
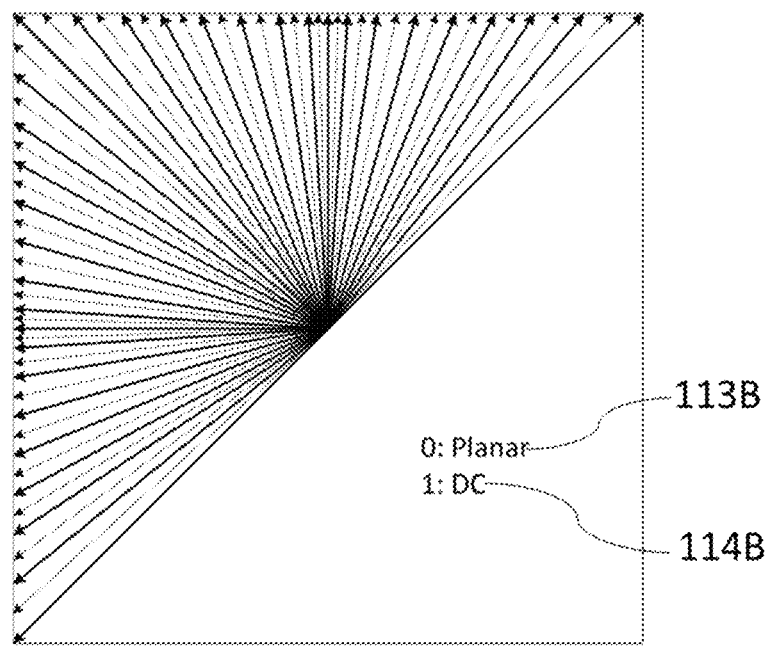
FIG. 1 is a block diagram showing an example of 67 intra prediction modes.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise Intra prediction of a CU in video coding may be done by using spatial modes of nearby CUs to extrapolate adjacent pixel values over the current CU. In an example of intra prediction, intra mode coding method with 67 intra prediction modes is disclosed. However, more or less prediction modes may be used.

To capture the arbitrary edge directions presented in natural video, the number of directional intra modes is extended from 33, as used in HEVC, to 65. The additional directional modes are depicted as dotted arrows in FIG. 1, and the planar and DC modes remain the same. The DC mode and the planar mode may be modes that use average values to generate smooth samples. The DC mode may use average of all samples, whereas the planar mode may use the average of two linear predictions. These denser directional intra prediction modes apply for all block sizes and for both luma and chroma intra predictions. The luminance (or short luma) component Y represents the brightness or grey level intensity (e.g. like in a grey-scale picture), while the two chrominance (or short chroma) components Cb and Cr represent the chromaticity or color information components.

To accommodate the increased number of directional intra modes, an intra mode coding method with 6 Most Probable Modes (MPMs) is used in this example. The MPM list may also have 3 entries or 1 entry or any number of entries. Two major technical aspects are involved: 1) the derivation of 6 MPMs, and 2) entropy coding of 6 MPMs and non-MPM modes.

Figure 2:
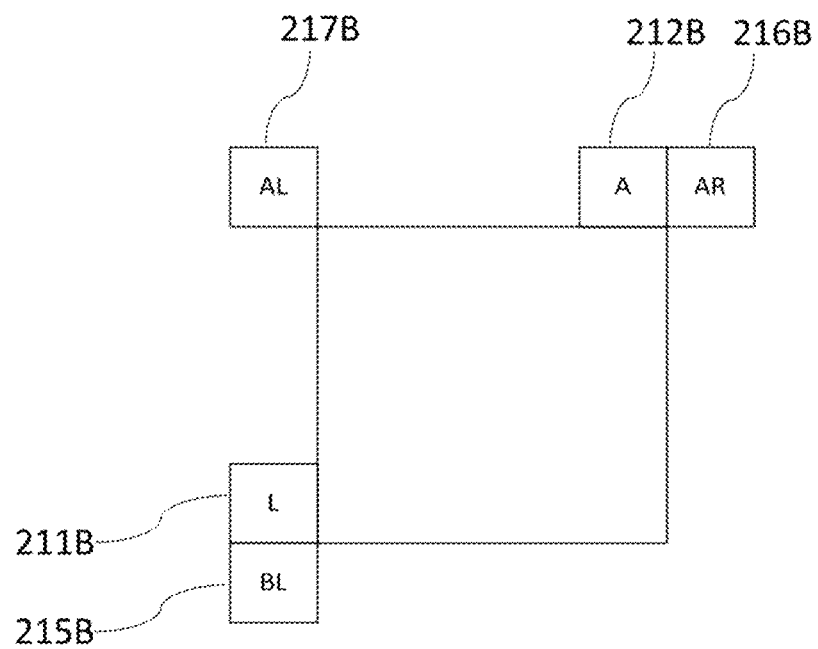
FIG. 2 is a block diagram showing an example for neighboring blocks for MPM derivation.

The modes included into the MPM lists are classified into three groups:
  Neighbour intra modes
  Derived intra modes
  Default intra modes Five neighbouring intra prediction modes are used to form the MPM list. Those locations of the 5 neighbouring blocks are the same as those used in the merge mode, i.e., left (L), above (A), below-left (BL), above-right (AR), and above-left (AL) as shown in FIG. 2. An initial MPM list is formed by inserting 5 neighbour intra modes and the planar and DC modes into the MPM list. A pruning process is used to remove duplicated modes so that only unique modes can be included into the MPM list. The order in which the initial modes are included is: left, above, planar, DC, below-left, above-right, and then above-left.

If the MPM list is not full (i.e., there are less than 6 MPM candidates in the list), derived modes are added; these intra modes are obtained by adding −1 or +1 to the angular modes that are already included in the MPM list. Such additional derived modes are not generated from the non-angular modes (DC or planar).

Finally, if the MPM list is still not complete, the default modes are added in the following order: vertical, horizontal, mode 2, and diagonal mode. As a result of this process, a unique list of 6 MPM modes is generated.

For entropy coding of the selected mode using the 6 MPMs, a truncated unary binarization is used. The first three bins are coded with contexts that depend on the MPM mode related to the bin currently being signalled. The MPM mode is classified into one of three categories: (a) modes that are predominantly horizontal (i.e., the MPM mode number is less than or equal to the mode number for the diagonal direction), (b) modes that are predominantly vertical (i.e., the MPM mode is greater than the mode number for the diagonal direction), and (c) the non-angular (DC and planar) class. Accordingly, three contexts are used to signal the MPM index based on this classification.

The coding for selection of the remaining 61 non-MPMs is done as follows. The 61 non-MPMs are first divided into two sets: a selected modes set and a non-selected modes set. The selected modes set contains 16 modes and the rest (45 modes) are assigned to the non-selected modes set. The mode set that the current mode belongs to is indicated in the bitstream with a flag. If the mode to be indicated is within the selected modes set, the selected mode is signalled with a 4-bit fixed-length code, and if the mode to be indicated is from the non-selected set, the selected mode is signalled with a truncated binary code. The selected modes set is generated by sub-sampling the 61 non-MPM modes as follows:

Selected modes set={0, 4, 8, 12, 16, 20 . . . 60}
Non-selected modes set={1, 2, 3, 5, 6, 7, 9, 10 . . . 59}

At the encoder side, the similar two-stage intra mode decision process of HM is used wherein HM is a test model in HVEC. In the first stage, i.e., the intra mode pre-selection stage, a lower complexity Sum of Absolute Transform Difference (SATD) cost is used to pre-select N intra prediction modes from all the available intra modes. In the second stage, a higher complexity R-D cost selection is further applied to select one intra prediction mode from the N candidates. However, when 67 intra prediction modes is applied, since the total number of available modes is roughly doubled, the complexity of the intra mode pre-selection stage will also be increased if the same encoder mode decision process of HM is directly used. To minimize the encoder complexity increase, a two-step intra mode pre-selection process is performed. At the first step, N (N depends on intra prediction block size) modes are selected from the original 35 intra prediction modes (indicated by black solid arrows in FIG. 1) based on the Sum of Absolute Transform Difference (SATD) measure; At the second step, the direct neighbours (additional intra prediction directions as indicated by red dotted arrows in FIG. 1) of the selected N modes are further examined by SAID, and the list of selected N modes are updated. Finally, the first M MPMs are added to the N modes if not already included, and the final list of candidate intra prediction modes is generated for the second stage R-D cost examination, which is done in the same way as HM. The value of M is increased by one based on the original setting in the HM, and N is decreased somewhat as shown in Table 1.

TABLE 1

Number of mode candidates at the intra mode pre-selection step

| Intra prediction block size | 4 × 4 | 8 × 8 | 16 × 16 | 32 × 32 | 64 × 64 | >64 × 64 |
|---|---|---|---|---|---|---|
| HM | 8 | 8 | 3 | 3 | 3 | 3 |
| JEM with 67 intra prediction modes | 7 | 7 | 2 | 2 | 2 | 2 |

In another example of intra prediction, intra mode coding method based on BMS software (developed by JVET) is disclosed. Benchmark Set (BMS) is software that is used in tool tests.

Two main modifications are proposed with respect to the Intra mode signaling on top of BMS. The first one relates to the MPM list construction which includes three main changes: The first change being, Intra modes belonging to the second tier neighbors (non-adjacent neighbors) are inserted into the MPM list after the above left mode. The second change being, that the DC mode is inserted after the second tier neighbors intra modes are inserted. The third change replaces DIA (diagonal mode) with VDIA (vertical diagonal) mode in the default list which is used to complete the MPM list.

The second modification fills the 16 selected modes and the first 14 non-selected modes with offsets to the first two angular modes from the MPM list and 5 more non-selected modes are included from a default intra mode list which is ordered based on the intra mode probability occurrence.

BMS uses a total of 67 intra prediction modes. The intra mode is signaled by dividing the available intra modes into three different lists: MPM modes list, selected modes list and non-selected modes set. The 6 MPM modes are derived from five immediate spatial neighbors as shown in FIG. 2.

The order of insertion of intra modes into the MPM list is as follows: "Left (L)", "Above (A)", "Planar", "DC", "Below left (BL)", "above right (AR)", and "above left (AL)". The 16 selected modes are chosen from the remaining 61 modes with a fixed interval of value "4". The rest 45 modes are assigned to the non-selected modes set. The MPM mode is coded with a unary code, the selected mode is signaled with a 4-bit fixed length code, and the non-selected mode is coded with a truncated binary code. The binarization for the syntax element intra prediction mode is specified in Table 2.

TABLE 2

Intra prediction mode coding in BMS

| Intra prediction modes | MPM flag | Selected flag | Bin string |
|---|---|---|---|
| MPM modes (6) | 1 | | 0 |
| | | | 10 |
| | | | 110 |
| | | | 1110 |
| | | | 11110 |
| | | | 11111 |
| Selected modes (16) | 0 | 1 | 4 bits fixed length code |
| Non-selected modes (45) | 0 | 0 | Truncated binary code |

TABLE 2-continued

Intra prediction mode coding in BMS

| Intra prediction modes | MPM flag | Selected flag | Bin string |
| --- | --- | --- | --- |

Figure 3:
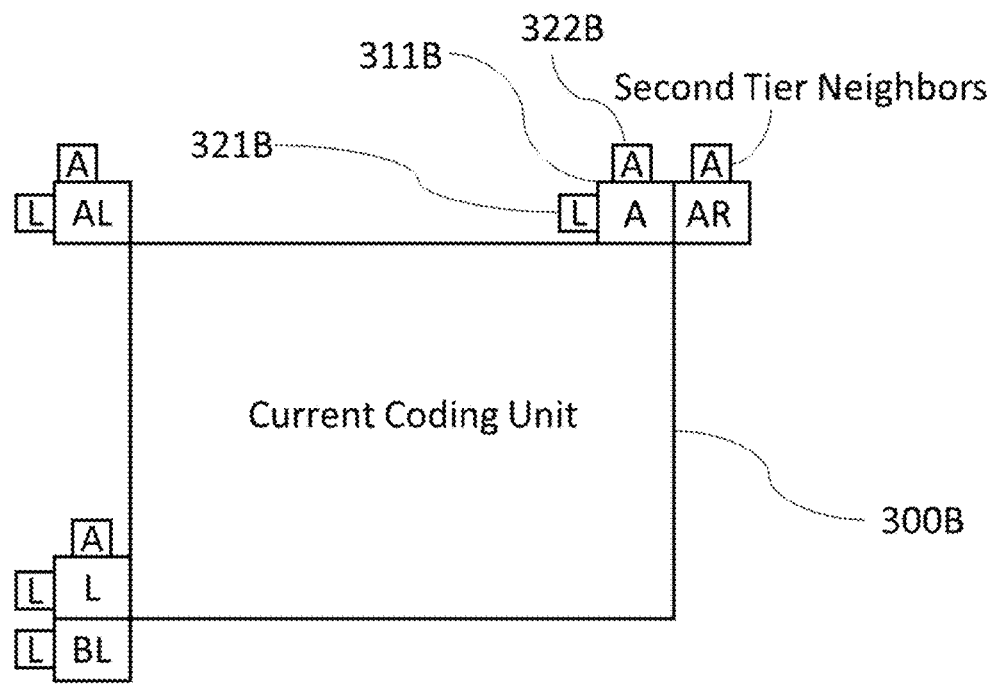
FIG. 3 is a block diagram showing an example for second tier (non-adjacent) intra modes considered in MPM list construction.

The proposed method consist of two main aspects. The first aspect relates to the modified MPM list construction which includes three main changes. The first change allows to include intra modes of "Second tier (non-adjacent)" spatial neighbors into the MPM list. As shown in FIG. 3, the intra modes of "Second tier spatial neighbors" are also considered for inclusion in the MPM list. They are inserted after the "Bottom Left (BL)" intra mode is inserted into the MPM list.

The second change suggests to move the inclusion of DC mode after the "Second Tier" spatial neighbor's intra mode insertion. The third change suggests to use vertical diagonal (VDIA) mode instead of diagonal mode (DIA) mode in the default list of intra modes which are used to complete the MPM list.

The non-adjacent neighbors and the DC mode might also be added to the MPM list at a different order or in a different way. Likewise, the modes from the adjacent neighbors might be added to the MPM list in a different order or a different way.

For instance, the second-tier-neighbors may be added instead of a direct neighbor every time said direct neighbor is not available. To do so, the second tier neighbors may be included in a predefined order. For instance if the above direct neighbor A (311B) is not available, the second tier neighbor 321B may be added if it is available. If the second tier neighbor 321B is not available either, the second tier neighbor 322B may be added instead. However, the order may also be altered. Alternatively the average of the modes of 321B and 322B may be used. As described later in this application, the second tier neighbors may also be inserted after all direct neighbors are inserted. The second aspect focuses on deriving the set of selected modes and non-selected modes based on the list of intra modes already included in the MPM list. Moreover the non-selected modes are truncated binarization coded: Out of the total 45 non-selected modes, the first 19 modes use 5 bits to signal the intra mode value, whereas the remaining 29 modes require 6 bits to signal the intra mode. To leverage this property, the proposed method also derives the first 19 non-selected modes based on the probability of intra mode occurrence.

The list of 16 selected modes and 14 out of the first 19 non-selected modes are generated by adding offsets of value "1" to the first 2 angular modes present in the MPM list. The remaining 5 out of first 19 non-selected modes are filled from a default intra mode list which is ordered based on the intra mode probability occurrence.

In another example of intra prediction, intra mode coding method based on VTM software (developed by JVET) is disclosed.

In current VTM s/w, there are in total 35 intra modes which is coded by 3MPM with 5-bit FLC for remaining mode coding. To support 67 intra prediction modes, current intra mode coding is modified to the remaining mode coding only from 5-bit FLC to 6-bit FLC.

An example for a derivation process for luma intra prediction mode is given in the following:

Input to this process is a luma location (xPb, yPb) specifying the top-left sample of the current luma prediction block relative to the top-left luma sample of the current picture.

In this process, the luma intra prediction mode IntraPredModeY[xPb][yPb] is derived.

Table 3 specifies the value for the intra prediction mode and the associated names.

TABLE 3

Specification of intra prediction mode and associated names

| Intra prediction mode | Associated name |
| --- | --- |
| 0 | INTRA_PLANAR |
| 1 | INTRA_DC |
| 2..66 | INTRA_ANGULAR2..INTRA_ANGULAR66 |

IntraPredModeY[xPb][yPb] labelled 0 . . . 66 represents directions of predictions as illustrated in FIG. 1.

IntraPredModeY[xPb][yPb] is derived by the following ordered steps:
1. The neighbouring locations (xNbA, yNbA) and (xNbB, yNbB) are set equal to (xPb−1, yPb) and (xPb, yPb−1), respectively.
2. For X being replaced by either A or B, the variables candIntraPredModeX are derived as follows:
    The availability derivation process for a block in z-scan order as specified as HEVC standard is invoked with the location (xCurr, yCurr) set equal to (xPb, yPb) and the neighbouring location (xNbY, yNbY) set equal to (xNbX, yNbX) as inputs, and the output is assigned to availableX.
    The candidate intra prediction mode candIntraPredModeX is derived as follows:
        If availableX is equal to FALSE, candIntraPredModeX is set equal to INTRA_DC.
        Otherwise, if CuPredMode[xNbX][yNbX] is not equal to MODE_INTRA or pcm_flag[xNbX][yNbX] is equal to 1, candIntraPredModeX is set equal to INTRA_DC,
        Otherwise, if X is equal to B and yPb−1 is less than ((yPb»CtbLog2SizeY)«CtbLog2SizeY), candIntraPredModeB is set equal to INTRA_DC.
        Otherwise, candIntraPredModeX is set equal to IntraPredModeY[xNbX][yNbX].
3. The candModeList[x] with x=0 . . . 2 is derived as follows:
    If candIntraPredModeB is equal to candIntraPredModeA, the following applies:
    If candIntraPredModeA is less than 2 (i.e., equal to INTRA_PLANAR or INTRA_DC),
        candModeList[x] with x=0 . . . 2 is derived as follows:
        candModeList[0]=INTRA_PLANAR
        candModeList[1]=INTRA_DC
        candModeList[2]=INTRA_ANGULAR50
    Otherwise, candModeList[x] with x=0 . . . 2 is derived as follows:
        candModeList[0]=candIntraPredModeA
        candModeList[1]=2+((candIntraPredModeA+61) % 64)
        candModeList[2]=2+((candIntraPredModeA−2+1) % 64)
    Otherwise (candIntraPredModeB is not equal to candIntraPredModeA), the following applies:

candModeList[0] and candModeList[1] are derived as follows:
candModeList[0]=candIntraPredModeA
candModeList[1]=candIntraPredModeB
If neither of candModeList[0] and candModeList[1] is equal to INTRA_PLANAR, candModeList[2] is set equal to INTRA_PLANAR,
Otherwise, if neither of candModeList[0] and candModeList[1] is equal to INTRA_DC, candModeList[2] is set equal to INTRA_DC,
Otherwise, candModeList[2] is set equal to INTRA_ANGULAR50.

4. IntraPredModeY[xPb][yPb] is derived by applying the following procedure:
  If prev_intra_luma_pred_flag[xPb][yPb] is equal to 1, the IntraPredModeY[xPb][yPb] is set equal to candModeList[mpm_idx[xPb][yPb]].
  Otherwise, IntraPredModeY[xPb][yPb] is derived by applying the following ordered steps:
    1) The array candModeList[x], x=0 . . . 2 is modified as the following ordered steps:
      i. When candModeList[0] is greater than candModeList[1], both values are swapped as follows:
        (candModeList[0], candModeList[1])=Swap (candModeList[0], candModeList[1])
      ii. When candModeList[0] is greater than candModeList[2], both values are swapped as follows:
        (candModeList[0], candModeList[2])=Swap (candModeList[0], candModeList[2])
      iii. When candModeList[1] is greater than candModeList[2], both values are swapped as follows:
        (candModeList[1], candModeList[2])=Swap (candModeList[1], candModeList[2])
    2) IntraPredModeY[xPb][yPb] is derived by the following ordered steps:
      i. IntraPredModeY[xPb][yPb] is set equal to rem_intra_luma_pred_mode[xPb][yPb].
      ii. For i equal to 0 to 2, inclusive, when IntraPredModeY[xPb][yPb] is greater than or equal to candModeList[i], the value of IntraPredModeY[xPb][yPb] is incremented by one.

In another example of intra prediction, it is proposed to adaptively replace several conventional angular intra prediction modes with wide-angle intra prediction modes for non-square blocks.

VTM/BMS specifies 33/65 angular intra prediction modes in addition to the planar and DC modes. These prediction directions are defined from 45 degrees to −135 degrees in clockwise direction. For a target block of size W×H pixels, the top reference samples array and the left reference samples array are each of size (W+H+1), which is required to cover the afore-mentioned angle range for all target pixels. This definition of the set of angles in VTM/BMS was done for compatibility with HEVC specified directions, without considering the QTBT structure.

Figure 4:
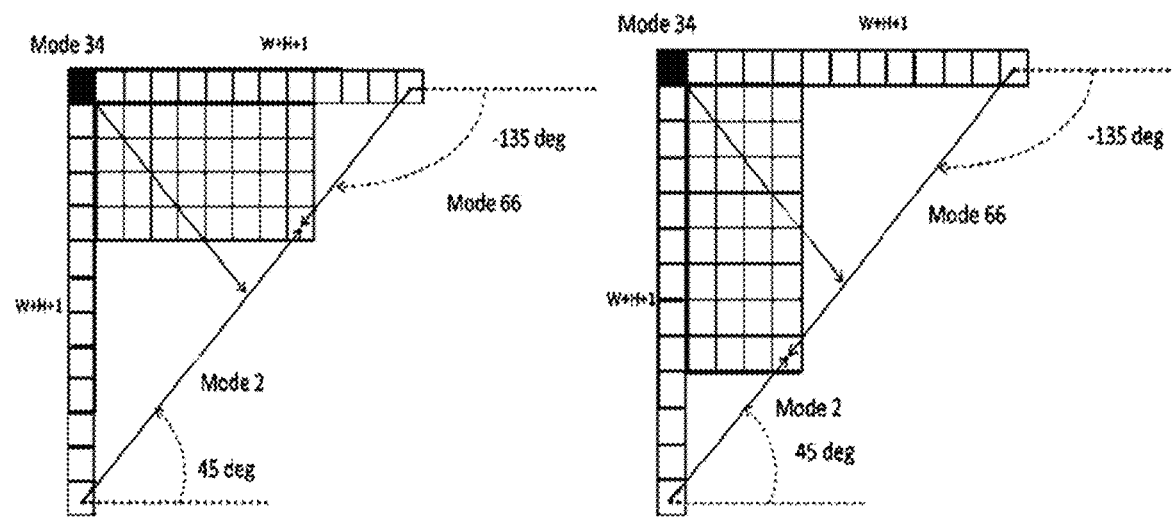
FIG. 4 is a block diagram showing an example for rectangular target blocks (flat block on the left, tall block on the right) with their top and left reference arrays.
Figure 5:
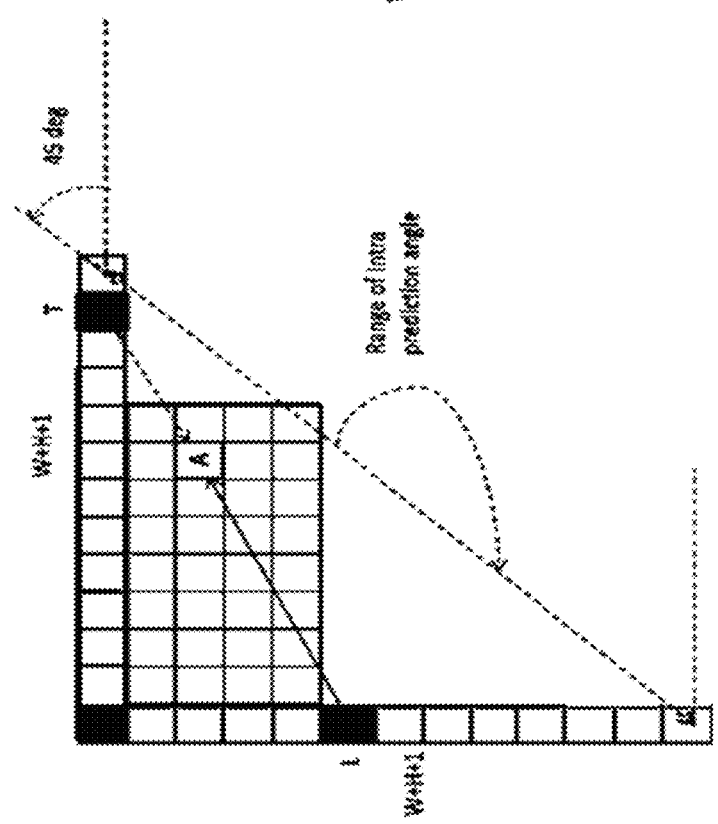
FIG. 5 is a block diagram showing another example for rectangular target blocks (flat block on the left, tall block on the right) with their top and left reference arrays.
Figure 5:
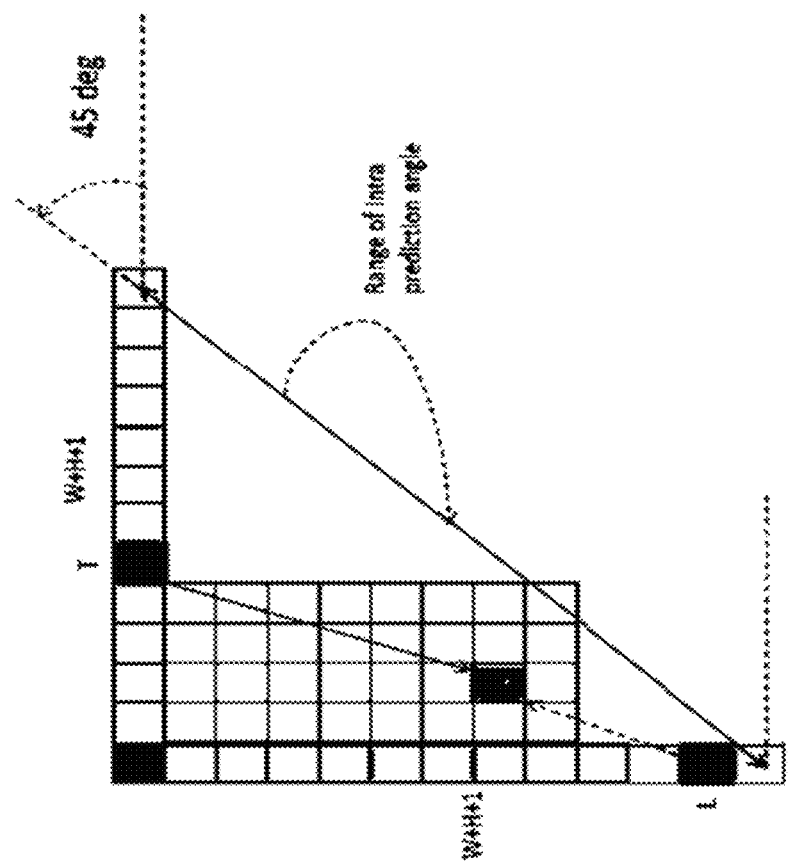

For instance, when the block is flat (i.e, W>H), it is placed closer to the top reference array, but asymmetrically. Similarly, when the block is tall (i.e., W<H), it is placed closer to the left reference array, but asymmetrically. This asymmetry is shown in FIG. 4. Here, exemplary rectangular target blocks (flat block on the left, tall block on the right) with their top and left reference arrays are shown. The target blocks are asymmetrically placed w.r.t. the two reference arrays The result of this asymmetry is that for some prediction modes, the target pixel will be predicted from a farther reference array, whereas the nearer reference array will be excluded because of the defined angles. This is shown in FIG. 5. Here, exemplary rectangular target blocks (flat block on the left, tall block on the right) with their top and left reference arrays are shown. On the left, the target pixel A has the predictor sample L on the left reference array with a horizontal prediction direction; Though the sample T on the top reference array is nearer, the vertical prediction direction, so that T could be the predictor sample for A, is not allowed in VTM/BMS. The right figure shows the analogous case for a target pixel in a tall block.

For non-square blocks, it is proposed to replace several conventional angular intra prediction modes with wide angular modes. The replaced modes are signaled using the original method and remapped to the indexes of wide angular modes after parsing. The total number of intra prediction modes is unchanged, i.e., 35 as in VTM-1.0, or 67 as in BMS-1.0, and the intra mode coding is unchanged.

Figure 6:
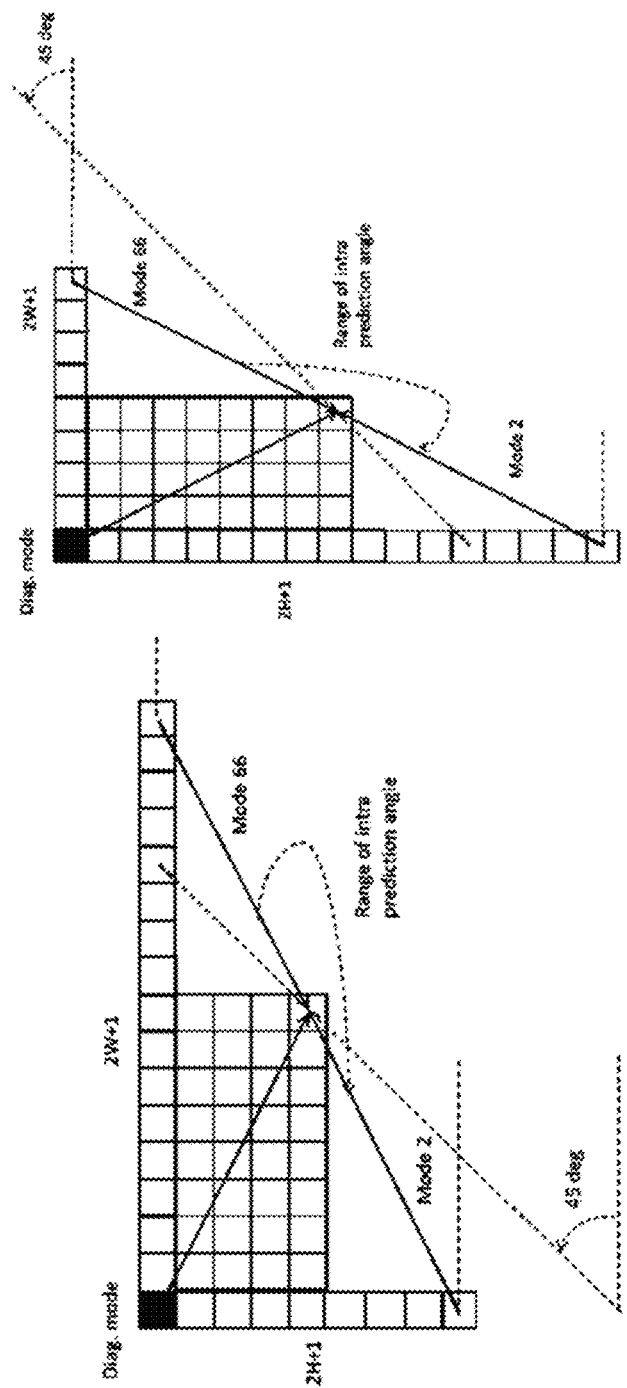
FIG. 6 is a block diagram showing an example for rectangular target blocks wherein the top reference array has length 2 W+1, left reference array has length 2H+1.

To support these prediction directions, it is proposed to define the top reference with length 2 W+1, and the left reference with length 2H+1, as shown in FIG. 6. The example shows an example for rectangular target blocks wherein the top reference array has length 2 W+1, left reference array has length 2H+1. In the case of a square block, the directions and the lengths of the reference arrays are identical to those in VTM/BMS;

In case of 35 intra prediction modes, the replaced intra prediction modes are illustrated in below Table 4.

TABLE 4

Intra prediction modes replaced by wide-angular modes when 35 intra prediction modes are used.

| Condition | Replaced intra prediction modes |
|---|---|
| W/H == 2 | Modes 2, 3, 4 |
| W/H > 2 | Modes 2, 3, 4, 5, 6 |
| W/H == 1 | None |
| H/W == ½ | Modes 32, 33, 34 |
| H/W < ½ | Modes 30, 31, 32, 33, 34 |

In case of 67 intra prediction modes, the replaced intra prediction modes are illustrated in below Table 5.

TABLE 5

Intra prediction modes replaced by wide-angular modes when 67 intra prediction modes are used.

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == ½ | Modes 61, 62, 63, 64, 65, 66 |
| H/W < 1/2 | Mode 57, 58, 59, 60, 61, 62, 63, 64, 65, 66 |

Figure 7:
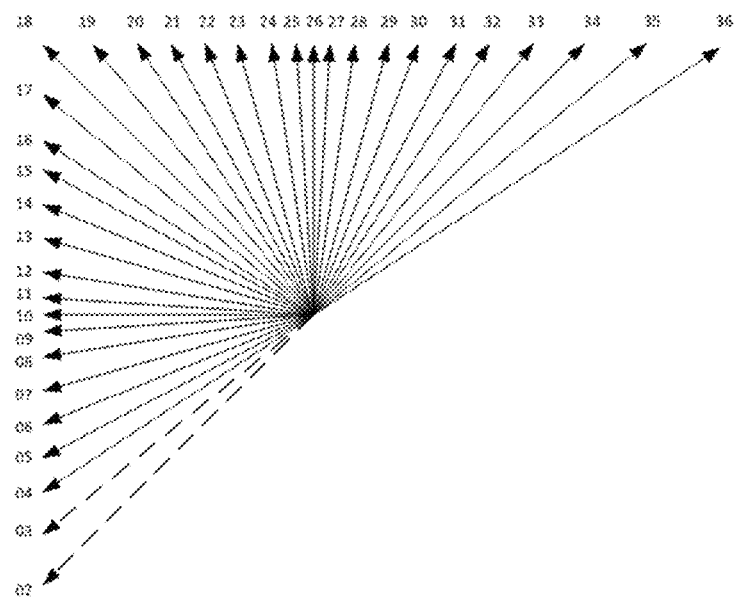
FIG. 7 is a block diagram showing an illustration of the replaced angular modes and added wide angular modes.

FIG. 7 shows an example of how angular intra modes are replaced with wide angular modes for non-square blocks. In this example, mode 2 and mode 3 are replaced with wide angle mode 35 and mode 36, where the direction of mode 35 is pointing to the opposite direction of mode 3, and the direction of mode 36 is pointing to the opposite direction of mode 4.

This new definition of modes requires to adapt the MPM-based prediction mode coding. Since the neighbor blocks of a target block can have different shapes from the target block, their prediction modes need to be mapped to the prediction modes of the target block. A simple solution is to use the original mode indexing with respective directions. In this case, the mode indices corresponding to the removed directions for a target block are mapped to the closest opposite direction which are newly included. If the direction of prediction associated with a mode is still valid for a target block, there is no mapping required.

Figure 8:
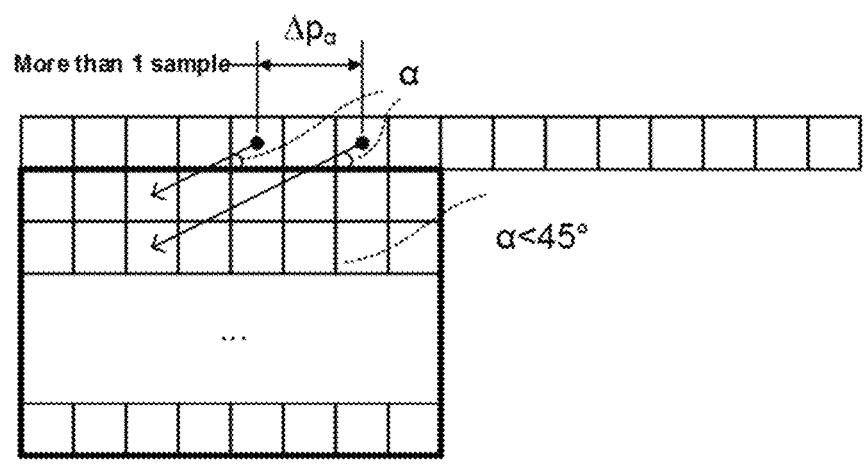
FIG. 8 is a block diagram showing an example for the problem of discontinuity in case of directions beyond 45 deg.

Finally, as can be noticed in FIG. 8, two vertically-adjacent predicted samples may use two non-adjacent reference samples in the case of wide-angle intra prediction. Hence, low-pass reference samples filter and side smoothing are applied to wide-angle prediction to reduce the negative effect of the increased gap $\Delta p\alpha$.

As shown in above examples, MPM (Most Probable Modes) list with adjacent blocks is used by intra prediction methods. However, in some cases, the adjacent blocks might not be available, i.e. the adjacent blocks might be out of boundaries of a frame, or the adjacent blocks are inter-predicted blocks in P or B frames. In another case, the adjacent blocks might have the same prediction mode, thus only said same prediction mode, but not two as general case, is filled in the MPM list, since the entries in MPM shall be unique. The efficiency of intra prediction is decreased since the MPM mode is not utilized sufficiently, especially when the MPM list allows duplicated intra modes.

The present disclosure aims to overcome the above problem and to provide an apparatus for intra prediction with an improved coding efficiency, and a respective method.

In the present disclosure, the term "sample" is used as a synonym to "pixel". In particular, a "sample value" means any value characterizing a pixel, such as a luma or chroma value.

A "picture" in the present disclosure means any kind of image picture, and applies, in particular, to a frame of a video signal. However, the present disclosure is not limited to video encoding and decoding but is applicable to any kind of image processing using intra-prediction.

Figure 9:
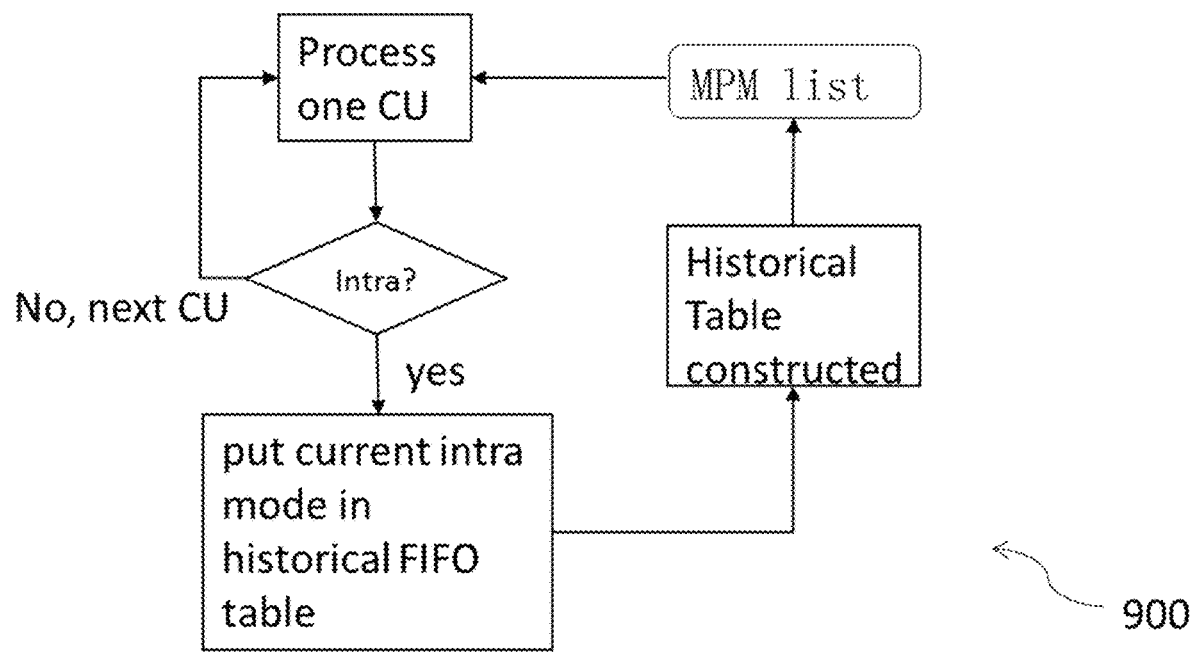
FIG. 9 is a block diagram showing an example for utilization of historical intra modes as alternative intra mode predictors.

In a first aspect of the present disclosure, an intra prediction method utilizing historical intra modes is provided. The method includes two parts: (1) Constructing MPM list of the current coding unit using a Historical Table with intra prediction mode; (2) Constructing the Historical Table. FIG. 9 shows a general process of the present solution.

Step 1: Determining whether the current CU is coded/decoded by intra mode;

Step 2: When the current CU is coded/decoded by intra mode, record the intra mode of the current CU in a Historical Table (for example, a first-in-first-out (FIFO) one);

Step 3: Processing the next CU with a MPM list, which is constructed with the Historical Table.

In a second aspect of the present disclosure, an encoding apparatus for encoding a current block of a picture is provided. The encoding apparatus comprises an apparatus for intra-prediction according to the first aspect for providing a predicted block for the current block and processing circuitry configured to encode the current block on the basis of the predicted block.

In a third aspect of the present disclosure, a decoding apparatus for decoding the current encoded block of a picture is provided. The decoding apparatus comprises an apparatus for intra-prediction according to the first aspect of the present disclosure for providing the predicted block for the encoded block and processing circuitry configured to reconstruct the current block on the basis of the encoded block and the predicted block.

In a fourth aspect of the present disclosure, a method of encoding a current block of a picture is provided. The method comprises the steps of providing a predicted block for the current block by performing the method according to the first aspect for the samples of the current block and of encoding the current block on the basis of the predicted block.

In a fifth aspect of the present disclosure, a method of decoding a current block of a picture is provided. The method comprises the steps of providing a predicted block for the current block by performing the method according to the first aspect for the samples of the current block and of reconstructing the current block on the basis of the predicted block.

In a sixth aspect of the present disclosure, a computer readable medium storing instructions, which when executed on a processor cause the processor to perform all steps of a method according to the first, fourth, or fifth aspects of the disclosure.

It is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (COding and DECoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" or "image" and equivalent the term "picture data" or "image data" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 10 to 12.

Figure 10:
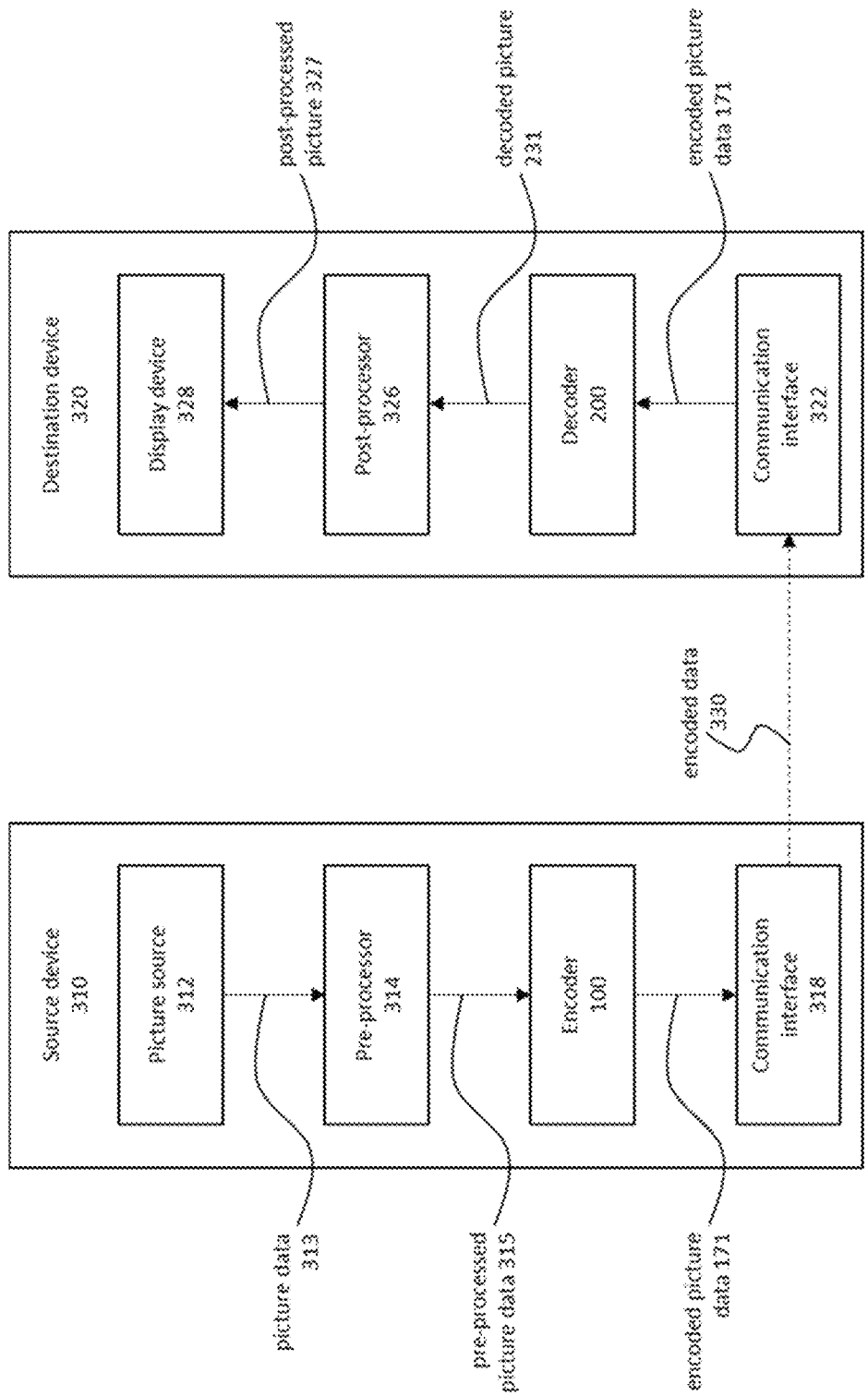
FIG. 10 is a block diagram showing an example of a video coding system.

FIG. 10 is a conceptional or schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures or images and any other kind of picture or image will be referred to as "picture" "image" or "picture data" or "image data", unless specifically described otherwise, while the previous explanations with regard to the terms "picture" or "image" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 313 may be the same interface as or a part of the communication interface 318.

Interfaces between units within each device include cable connections, USB interfaces, Communication interfaces 318 and 322 between the source device 310 and the destination device 320 include cable connections, USB interfaces, radio interfaces, In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 11).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured to receive the encoded picture data 171 or the encoded data 330, e.g. directly from the source device 310 or from any other source, e.g. a memory, e.g. an encoded picture data memory.

The communication interface 318 and the communication interface 322 may be configured to transmit respectively receive the encoded picture data 171 or encoded data 330 via a direct communication link between the source device 310 and the destination device 320, e.g. a direct wired or wireless connection, including optical connection or via any kind of network, e.g. a wired or wireless network or any combination thereof, or any kind of private and public network, or any kind of combination thereof.

The communication interface 318 may be, e.g., configured to package the encoded picture data 171 into an appropriate format, e.g. packets, for transmission over a communication link or communication network, and may further comprise data loss protection.

The communication interface 322, forming the counterpart of the communication interface 318, may be, e.g., configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 10 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231.

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display, such as projectors, holographic displays, apparatuses to generate holograms . . . .

Although FIG. 10 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 10 may vary depending on the actual device and application.

In the following, a few non-limiting examples for the coding system 300, the source device 310 and/or destination device 320 will be provided.

Various electronic products, such as a smartphone, a tablet or a handheld camera with integrated display, may be seen as examples for a coding system 300. They contain a display device 328 and most of them contain an integrated camera, i.e. a picture source 312, as well. Picture data taken by the integrated camera is processed and displayed. The processing may include encoding and decoding of the picture data internally. In addition, the encoded picture data may be stored in an integrated memory.

Alternatively, these electronic products may have wired or wireless interfaces to receive picture data from external sources, such as the internet or external cameras, or to transmit the encoded picture data to external displays or storage units.

On the other hand, set-top boxes do not contain an integrated camera or a display but perform picture processing of received picture data for display on an external display device. Such a set-top box may be embodied by a chipset, for example.

Alternatively, a device similar to a set-top box may be included in a display device, such as a TV set with integrated display.

Surveillance cameras without an integrated display constitute a further example. They represent a source device with an interface for the transmission of the captured and encoded picture data to an external display device or an external storage device.

Contrary, devices such as smart glasses or 3D glasses, for instance used for AR or VR, represent a destination device 320. They receive the encoded picture data and display them.

Therefore, the source device 310 and the destination device 320 as shown in FIG. 10 are just example embodiments of the disclosure and embodiments of the disclosure are not limited to those shown in FIG. 10.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like. For large-scale professional encoding and decoding, the source device 310 and/or the destination device 320 may additionally comprise servers and work stations, which may be included in large networks. These devices may use no or any kind of operating system.

Encoder & Encoding Method

Figure 11:
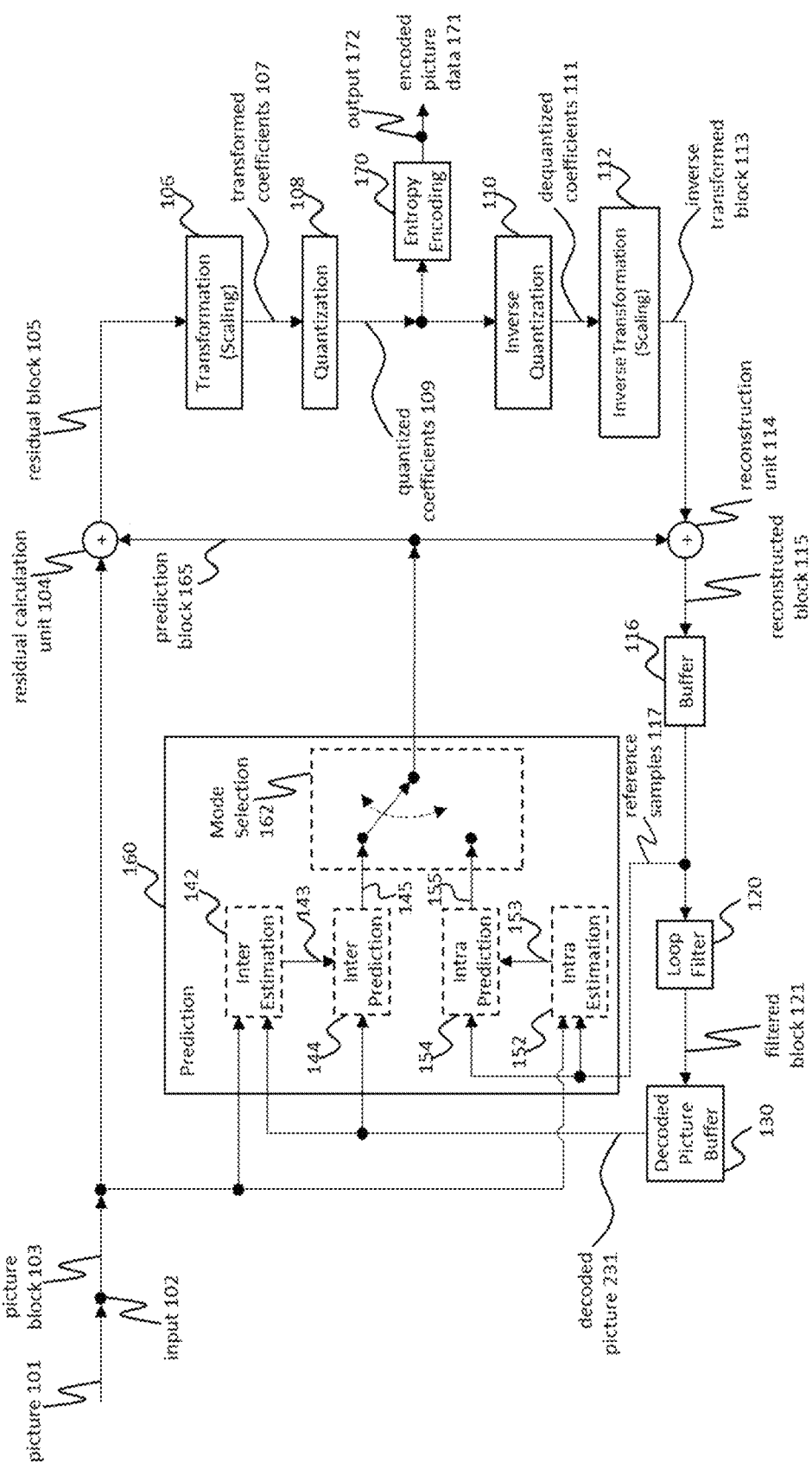
FIG. 11 is a block diagram showing an example of a video encoder.

FIG. 11 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 116, a loop filter 120, a decoded picture buffer (DPB) 130, a prediction unit 160, which includes an inter estimation unit 142, an inter prediction unit 144, an intra-estimation unit 152, an intra-prediction unit 154 and a mode selection unit 162, an entropy encoding unit 170, and an output 172. A video encoder 100 as shown in FIG. 8 may also be referred to as hybrid video encoder or a video encoder according to a hybrid video codec. Each unit may consist of a processor and a non-transitory memory to perform its processing steps by executing a code stored in the non-transitory memory by the processor.

Figure 12:
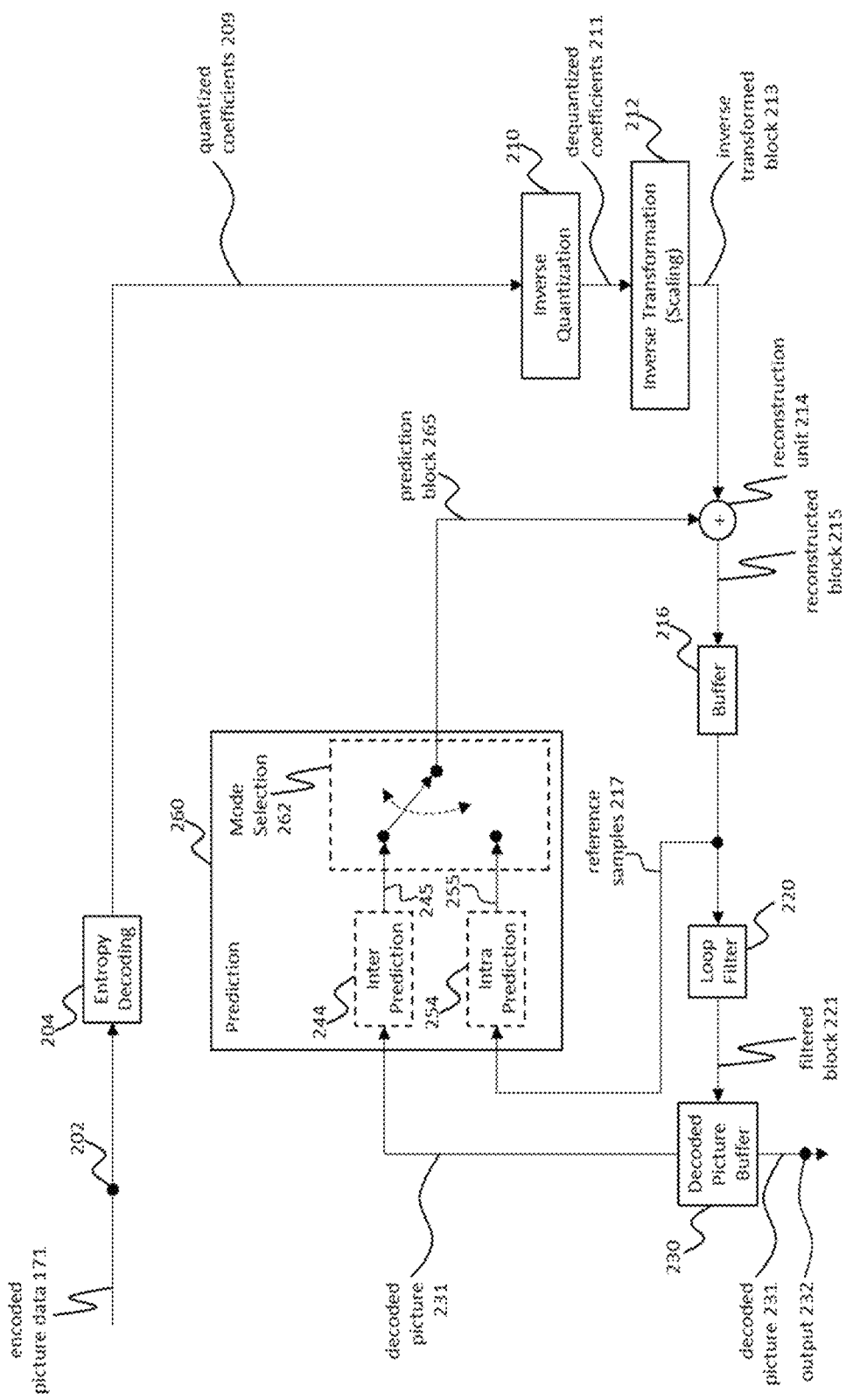
FIG. 12 is a block diagram showing an example of a video decoder.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 116, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder to provide inverse processing for identical reconstruction and prediction (see decoder 200 in FIG. 12).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture).

Partitioning

Embodiments of the encoder 100 may comprise a partitioning unit (not depicted in FIG. 11), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

Each block of the plurality of blocks may have square dimensions or more general rectangular dimensions. Blocks being picture areas with non-rectangular shapes may not appear.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 11 is configured to encode the picture 101 block by block, e.g. the encoding and prediction is performed per block 103.

Residual Calculation

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain.

Transformation

The transformation unit 106 is configured to apply a transformation, e.g. a spatial frequency transform or a linear spatial transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

Quantization

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 110, may include multiplication by the quantization step size. Embodiments according to HEVC (High-Efficiency Video Coding), may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the encoder 100 (or respectively of the quantization unit 108) may be configured to output the quantization settings including quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain dequantized coefficients 111, e.g. by applying the inverse of the quantization scheme applied by the quantization unit 108 based on or using the same quantization step size as the quantization unit 108. The dequantized coefficients 111 may also be referred to as dequantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g. the buffer unit 116 is not only used for storing the reconstructed blocks 115 for intra estimation 152 and/or intra prediction 154 but also for the loop filter unit 120, and/or such that, e.g. the buffer unit 116 and the decoded picture buffer unit 130 form one buffer. Further embodiments may be configured to use filtered blocks 121 and/or blocks or samples from the decoded picture buffer 130 (both not shown in FIG. 11) as input or basis for intra estimation 152 and/or intra prediction 154.

The loop filter unit 120 (or short "loop filter" 120), is configured to filter the reconstructed block 115 to obtain a filtered block 121, e.g. by applying a de-blocking sample-adaptive offset (SAO) filter or other filters, e.g. sharpening or smoothing filters or collaborative filters. The filtered block 121 may also be referred to as filtered reconstructed block 121.

Embodiments of the loop filter unit 120 may comprise a filter analysis unit and the actual filter unit, wherein the filter analysis unit is configured to determine loop filter parameters for the actual filter. The filter analysis unit may be configured to apply fixed pre-determined filter parameters to the actual loop filter, adaptively select filter parameters from a set of predetermined filter parameters or adaptively calculate filter parameters for the actual loop filter.

Embodiments of the loop filter unit 120 may comprise (not shown in FIG. 11) one or a plurality of filters (such as loop filter components and/or subfilters), e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph.

Embodiments of the encoder 100 (respectively loop filter unit 120) may be configured to output the loop filter parameters, e.g. directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the disclosure may also be configured to use the previously filtered blocks and corresponding filtered sample values of the decoded picture buffer 130 for any kind of estimation or prediction, e.g. intra estimation and prediction as well as inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

Mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least fulfills a prediction mode selection criterion.

In the following the prediction processing (e.g. prediction unit 160) and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DPB 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g. reconstructed blocks of one or a plurality of other/different previously decoded pictures 231, for inter estimation (or "inter picture estimation"). E.g. a video sequence may comprise the current picture and the previously decoded pictures 231, or in other words, the current picture and the previously decoded pictures 231 may be part of or form a sequence of pictures forming a video sequence.

The encoder 100 may, e.g., be configured to select (obtain/determine) a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 11 shows two distinct units (or steps) for the inter-coding, namely inter estimation 142 and inter prediction 152, both functionalities may be performed as one (inter estimation typically requires/comprises calculating an/the inter prediction block, i.e. the or a "kind of" inter prediction 154), e.g. by testing all possible or a predetermined subset of possible inter prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select (obtain/determine) an intra prediction mode from a plurality of intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion.

The intra prediction unit 154 is configured to determine based on the intra prediction parameter 153, e.g. the selected intra prediction mode 153, the intra prediction block 155.

Although FIG. 11 shows two distinct units (or steps) for the intra-coding, namely intra estimation 152 and intra prediction 154, both functionalities may be performed as one (intra estimation typically requires/comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bitstream 171.

Decoder

FIG. 12 shows an exemplary video decoder 200 configured to receive encoded picture data (e.g. encoded bitstream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, which includes an inter prediction unit 244, an intra prediction unit 254, and a mode selection unit 260, and an output 232.

The entropy decoding unit 204 is configured to perform entropy decoding to the encoded picture data 171 to obtain, e.g., quantized coefficients 209 and/or decoded coding parameters (not shown in FIG. 12), e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 220 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an intra prediction unit 254, wherein the inter prediction unit 244 may be identical in function to the inter prediction unit 144, and the intra prediction unit 254 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 231, e.g. via output 232, for presentation or viewing to a user.

Referring back to FIG. 10, the decoded picture 231 output from the decoder 200 may be post-processed in the post-processor 326. The resulting post-processed picture 327 may be transferred to an internal or external display device 328 and displayed.

DETAILS OF EMBODIMENTS AND EXAMPLES

Embodiment 1 (First-In-First-Out Historical Table)

The Historical Table can be constructed as following, and the position of entry in the table depends on its input order, when the intra mode of the table is added into the MPM list, the intra mode which is added into the table later will be added into the MPM list earlier:

Embodiment 1.1

Step 1: Processing a coding unit;
Step 2: When the coding unit is coded using intra prediction, checking whether a Historical Table is full (the size of the table is S);

Step 3.1: When the table is not full, adding the intra mode of the coding unit into the table, and the position of the added intra mode in the table is last one (the most recent entry);
Step 3.2: When the table is full, overwriting every entry by its adjacent later added one, then adding the intra mode of the coding unit into the table. For example, the size of the table is 3, the intra prediction modes in the table are A, B, C, and A is the first one to be added into the table, C is the last one to be added into the table. After D is added, the intra modes in the table are B, C, D. The same technique can be used with tables of other sizes.

Figure 13:
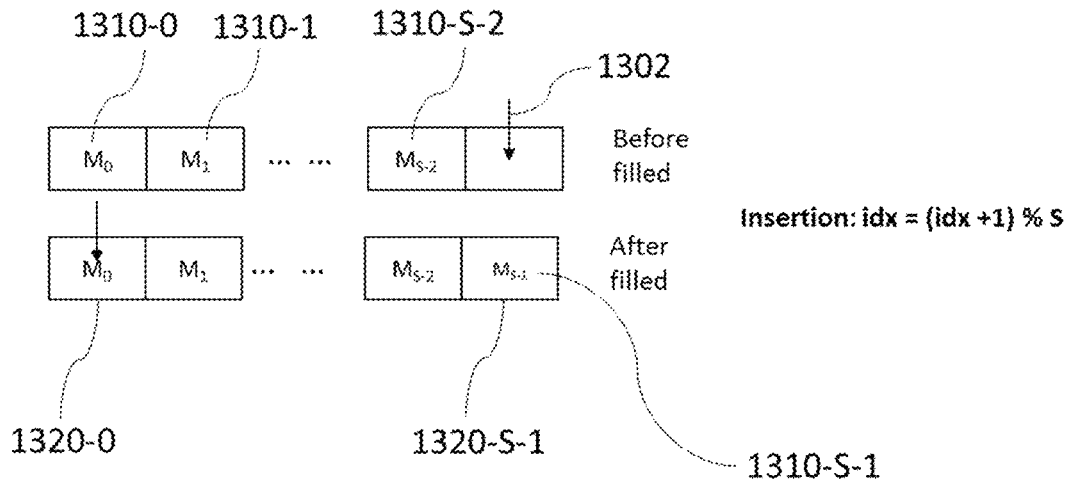
FIG. 13 is a block diagram showing an example for a specific case of the embodiment 1.1.

FIG. 13 shows a specific case of the embodiment 1.1. 1301 is a FIFO table. In this example, when 1310-S-1 is added to the table, entries 1301-0 to 1301-S-2 are already in the table. However, the table is not full and the position for the most recent entry 1320-S-1 is vacant. Consequently 1310-S-1 is added at the position of the most recent entry 1320-S-1. The position for the least recent, or oldest, entry in this example is 1320-0. The pointer 1302 is a pointer to the position where the newest entry is to be inserted. FIG. 13 only shows an example for inserting a mode. There may also be more positions vacant. In this case, the newest mode is inserted in the first vacant position that is adjacent to the occupied positions. In a case where no position is vacant, the least recent entry, 1310-0 may be removed from the list and the entry 1310-1 may be moved to the position 1320-0. Equally, every entry may be moved to the left, and the newest entry may be inserted into the list at the most recent position 1320-S-1.

Embodiment 1.2

Step 1: Processing a coding unit;
Step 2: When the coding unit is coded using intra prediction, checking whether the intra prediction mode of the coding unit is in a Historical Table;
Step 3: If the intra prediction mode is not in the table, checking whether the table is full (the size of the table is S), otherwise (the intra prediction is in the table), the table will not be adjusted.
Step 4.1: When the table is not full, adding the intra mode of the coding unit into the table, and the position of the added intra mode in the table is last one (the most recent entry);
Step 4.2: When the table is full, overwriting every entry by its adjacent one, wherein the adjacent one of an entry is the one which is adjacent to said entry and added into the table later than said entry, then adding the intra mode of the coding unit into the table. For example, the size of the table is 3, the intra prediction modes in the table are A, B, C, and A is the first one to be added into the table, C is the last one to be added into the table. After D is added, the intra modes in the table are B, C, D.

In this example, if the entry to be added was C, the table would not be changed as the intra mode C is already in the table. The same would apply if A or B were to be added to the table. In case that the newest entry to be added was not found in the table, adding the entry according to the example according to this embodiment may be done in the same way as in the example of embodiment 1.1.

Embodiment 2 (Frequency Based Historical Intra Mode Table)

The Historical Table can be constructed as following, and the position of entry in the table, which may be signaled by one bit or more bits, also called bit for coding indicator in the following, depends on its frequency, when the intra mode of the table is added into the MPM list, the intra mode which has higher frequency will be added earlier: In this example, if a mode was to be added to the table twice, its frequency may be 2. In general, the frequency of an intra mode or entry may correspond to the number of times it is to be added to the table.

Embodiment 2.1

Step 1: Processing a coding unit;

Step 2: When the coding unit is coded using intra prediction, checking whether the intra mode of the coding unit is in a Historical Table;

Step 3.1: When the intra mode is in the table, updating the frequency of the intra mode by adding one;

Step 3.1.1: When the frequency of the intra mode is larger than the frequency of its adjacent entry, exchange the position of the intra mode and the adjacent entry;

Step 3.2: When the intra mode is not in the table, checking whether the table is full (the size of the table is S);

Step 3.2.1: When the table is full, overwriting the least frequency one by the intra mode of the coding unit, and recording the frequency of the intra mode as 1;

Step 3.2.2: When the table is not full, adding the intra mode of the coding unit into the table, and recording the frequency of the intra mode as 1.

Figure 14A:
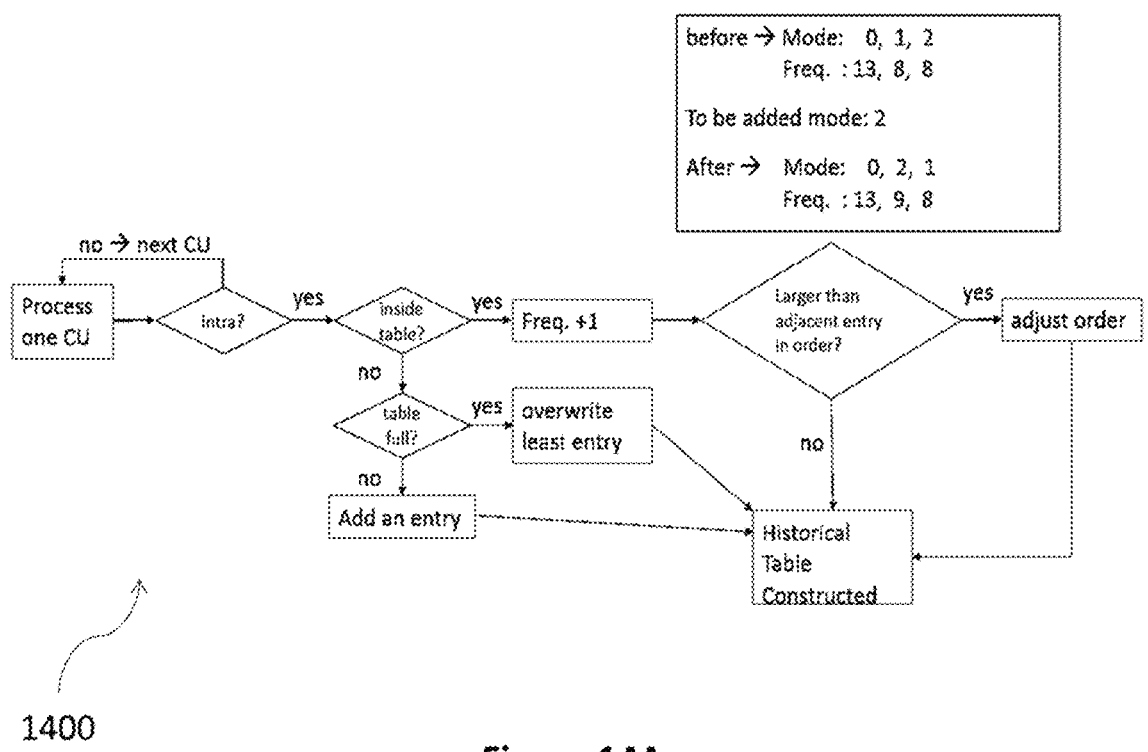
FIG. 14A is a block diagram showing an example for a specific case of embodiment 2.

FIG. 14A shows a specific case of the embodiment 2.1. Here Historical information are stored in an ordered table, maintaining a sorted historical intra mode table with size S based on intra mode frequency.

In this example, if more than two intra modes on adjacent entries in the table have the same frequency, and the frequency of one of these modes is incremented, the positions of the intra modes may be adjusted such that the mode with the now increased frequency is moved to the position where the mode on the adjacent position has the same or higher frequency or to the position where the mode in the adjacent position has a higher frequency. In another example, only modes on adjacent positions may be exchanged. However, exchanging modes on adjacent positions may be repeated until the modes are ordered by their frequencies again.

Furthermore, a secondary table may be used. In case that the first table, described as the historical table in the embodiment above, is full, and the mode with the smallest frequency is removed from the table, this mode may be added to the secondary table. In case that the frequency of the mode that was moved to the secondary table is increased at a later time, and the frequency of this mode becomes higher than the frequency of one or more modes in the first table, the mode may be moved from the secondary to the first table again and a mode that has a smaller frequency may be moved from the first to the second table instead.

Embodiment 2.2

Step 1: Processing a coding unit;

Step 2: When the coding unit is coded using intra prediction, checking whether the intra mode of the coding unit is in a Historical Table;

Step 3.1: When the intra mode is in the table, updating the frequency of the intra mode by adding one;

Step 3.1.1: When the frequency of the intra mode is larger than the frequency of its adjacent entry, exchange the position of the intra mode and the adjacent entry;

Step 3.2: When the intra mode is not in the table, adding the intra mode of the coding unit into the table, recording the frequency of the intra mode as 1, and put the intra mode on the position corresponding to frequency 1.

In this embodiment, the intra mode may be added above potential other entries with the frequency 1 that are already in the table. This means that in case that the table has the entries A, B, C with corresponding frequencies 2, 1, 1 and a new entry D was to be added, the new table may be A, D, B, C with corresponding frequencies 2, 1, 1, 1.

Embodiment 3 (MPM List Derivation Using Historical Intra Modes)

This embodiment describes how an MPM list may be generated using the intra modes from previously processed coding units also called historical intra modes.

The MPM list may be constructed using a readily created historical modes table. Alternatively, the MPM list and the historical table may be constructed in parallel as coding units are being processed.

According to the embodiment relates to FIG. 2, the MPM list may be filled in the following order:

1) Left, Above, Planar, DC, Below-Left, Above-Right, Above-Left
2) If MPM list is not full and there is(are) angular mode(s) in the existing MPM entries, fill the MPM list with modes derived by angular modes −1/+1
3) If MPM list is not full, filled the MPM list using the following order: vertical, horizontal, mode 2, and diagonal mode The above embodiment can be improved by using Historical Table described in the above sections, for example, FIFO table in Embodiment 1 or frequency based table in Embodiment 2.

In other words, in this embodiment the order in which the modes are added may be left (211B), above (212B), planar (113B), DC (114B), below-left (215B), above-right (216B), above-left (217B). This order of adding the modes to the table, or checking whether the modes are to be added to the list, may be combined with any of the strategies for adding modes to the table described above. If the MPM list is not full, derived modes may be added. This may mean that for modes that are already in the MPM list, neighboring modes are added. For instance, going through the MPM list from the first to the last entry or alternatively from the last to the first entry, for every entry X an additional entry having the value X+1 may be added and then an additional entry-X-1. In this example, the incremented and the decremented neighbor of each entry may be added before adding the neighbors of the next entries if the MPM list is still not full. Alternatively, first, for all entries the incremented neighbor may be added and when the table is not full after adding the incremented neighbors of all entries, the decremented neighbor of the entries are added until the MPM list is full.

It is noted that according to Table 2, when the index of MPM list is coded by various length coding, the index of intra mode which is added into the MPM list earlier will be assigned with less coding bits.

In other examples, the order for adding the modes may also be fixed, but different than described in this embodiment.

Embodiment 3.1

The MPM list may be filled in the following order:
1) Left, Above, Planar, DC, Below-Left, Above-Right, Above-Left
2) If MPM list is not full, use N (0<N<=S) entries in historical table to fill the MPM list
3) If MPM list is not full and there is(are) angular mode(s) in the existing MPM entries, fill the MPM list with modes derived by angular modes −1/+1
4) If MPM list is not full, filled the MPM list using the following order: vertical, horizontal, mode 2, and diagonal mode In other words, the MPM list may first be filled up with entries from the historical table until the MPM list is full. Then neighboring entries may be used to fill the MPM list as described above, and if the MPM list is still not full, vertical, horizontal, mode 2 and diagonal mode may be used.

Here, S may be the size of the historical table, N may define how many entries to use from the historical table, and the size of the MPM list may be M.

In the following, more examples how to fill the MPM list are described.

Embodiment 3.2

The MPM list may be filled in the following order:
1) Left, Above
2) If MPM list is not full, use N (0<N<=S) entries in historical table to fill the MPM list
3) Planar, DC, Below-Left, Above-Right, Above-Left
4) If MPM list is not full and there is(are) angular mode(s) in the existing MPM entries, fill the MPM list with modes derived by angular modes −1/+1
5) If MPM list is not full, filled the MPM list using the following order: vertical, horizontal, mode 2, and diagonal mode

Embodiment 3.3

The MPM list may be filled in the following order:
1) Left, Above, Planar
2) If MPM list is not full, use N (0<N<=S) entries in historical table to fill the MPM list
3) DC, Below-Left, Above-Right, Above-Left
4) If MPM list is not full and there is(are) angular mode(s) in the existing MPM entries, fill the MPM list with modes derived by angular modes −1/+1
5) If MPM list is not full, filled the MPM list using the following order:
vertical, horizontal, mode 2, and diagonal mode

Embodiment 3.4

The MPM list may be filled in the following order:
1) Left, Above, Planar, DC
2) If MPM list is not full, use N (0<N<=S) entries in historical table to fill the MPM list
3) Below-Left, Above-Right, Above-Left
4) If MPM list is not full and there is(are) angular mode(s) in the existing MPM entries, fill the MPM list with modes derived by angular modes −1/+1
5) If MPM list is not full, filled the MPM list using the following order: vertical, horizontal, mode 2, and diagonal mode

Embodiment 3.5

The MPM list may be filled in the following order:
1) Left, Above, Planar, DC, Below-Left, Above-Right, Above-Left
2) If MPM list is not full and there is(are) angular mode(s) in the existing MPM entries, fill the MPM list with modes derived by angular modes −1/+1
3) If MPM list is not full, use N (0<N<=S) entries in historical table to fill the MPM list
4) If MPM list is not full, filled the MPM list using the following order: vertical, horizontal, mode 2, and diagonal mode

Embodiment 3.6

Figure 14B:
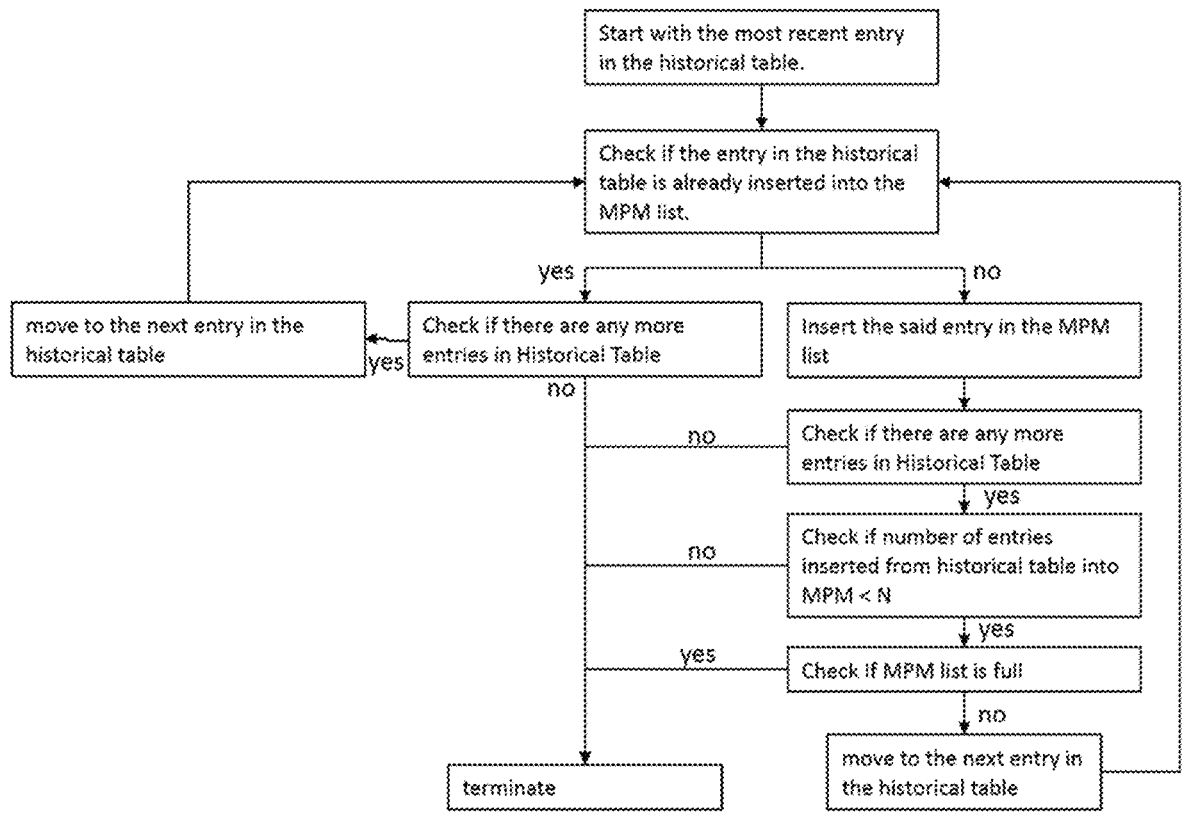
FIG. 14B is a block diagram showing an example for using the entries of a historical table to fill an MPM list.

According to embodiments 3.1 to 3.5, up to N (0<N<=S) entries in the historical table are inserted into MPM list. The process of insertion from the historical table to the MPM list can follow the steps of FIG. 14B:

In one possible example, using the most recent entry in the historical table, it may first be checked whether the entry is already in the MPM list. If it is already in the MPM list, it is not added to the MPM list again and it may be proceeded with the next entry from the MPM list. If the entry is not in the MPM list yet, it may be inserted and it may be checked if there are any more entries in the historical table left. If there are more entries left in the historical table, it may be checked whether the number of entries added to the MPM list from the historical table is smaller than a predefined number and if this is the case, it may be checked whether the MPM list is full. If this is not the case, it may be proceeded to the next entry of the historical table.

Embodiment 4 (Non-MPM List Derivation Using Historical Intra Modes)

In an embodiment, Non-MPM list shall be filled with intra modes not in the MPM list, and be filled in the following order:
1) Get the first two angular modes in the MPM list.
2) Set a variable offset=1
3) fill the non-MPM list with modes derived by the first two angular modes −offset/+offset
4) If non-MPM list is not full, offset=offset+1, and go to step 3.

In other words, the non-MPM list may be filled with the neighboring modes of the first to modes in the MPM list. In one example, at first, the first mode from the MPM list may be used, and the value of this mode incremented (+1) is added to the non-MPM list. Afterwards, the same mode may be used and a decremented value (−1) may be added to the non-MPM list. Then, the same procedure may be used with the second entry of the MPM list.

Alternatively after adding the incremented value of the first entry of the MPM list to the non-MPM list, the incremented value of the second entry of the MPM list may be added to the non-MPM list and then, the decremented value of the first entry of the MPM list, followed by the decremented value of the second entry of the MPM list may be added to the non-MPM list—

The above embodiment can be improved by using Historical Table described in the above sections, for example, FIFO table in Embodiment 1 or frequency based table in Embodiment 2.

Embodiment 4.1

In the following, more examples for ways to fill the MPM list are shown.

Non-MPM list shall be filled with intra modes not in the MPM list, and be filled in the following order:
1) Get the first two angular modes in the MPM list.
2) Set a variable offset=1
3) fill the non-MPM list with modes derived by the first two angular modes −offset/+offset
4) If non-MPM list is not full, use N (0<N<=S) entries in historical table to fill the non-MPM list
5) If non-MPM list is not full, offset=offset+1, and goto step 3.

Embodiment 4.2

Non-MPM list shall be filled with intra modes not in the MPM list, and be filled in the following order:
1) Use N (0<N<=S) entries in historical table to fill the non-MPM list
2) If non-MPM list is not full, filled the remaining entries using the approach in other embodiment of non-MPM list derivation.

Embodiment 5

It is also noted that the following features can be combined with the above embodiments.
1) The size of MPM is given as M (integer M>0)
2) The size of historical intra mode FIFO table is given as S (integer S>0).
3) The size to fetch the entries from the historical table is given as N (integer 0<N<=S), and fetching order can be:
   In case of FIFO table, the least recent N entries or the most recent N entries
   In case of frequency based table, the most frequent used N entries or the least frequent used N entries.
4) When filling the historical intra mode FIFO table, consider filling both with and without pruning In embodiments of present disclosure, the historical intra modes used by the previous processed coding units are kept and utilized by the candidate intra prediction mode derivation of the later processed coding unit. Since more prior information is used, the prediction is more efficient.

Embodiment 6

If the insertion order of the entries from the historical table to the MPM list follows predetermined intra prediction modes (such as Planar mode or DC mode), then the said predetermined intra prediction modes are not inserted into the historical table.

Figure 15:
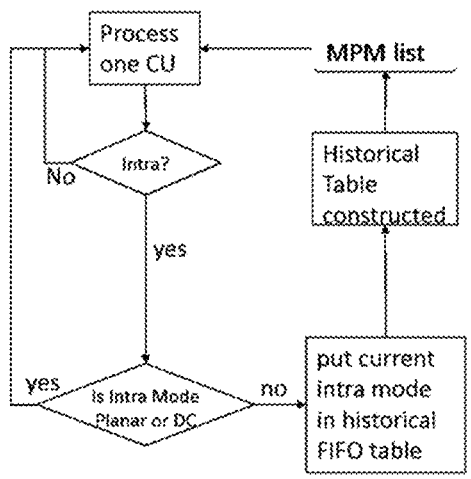
FIG. 15 is a block diagram showing an example for a specific implementation of the invention according to Embodiment 6.
Figure 16:
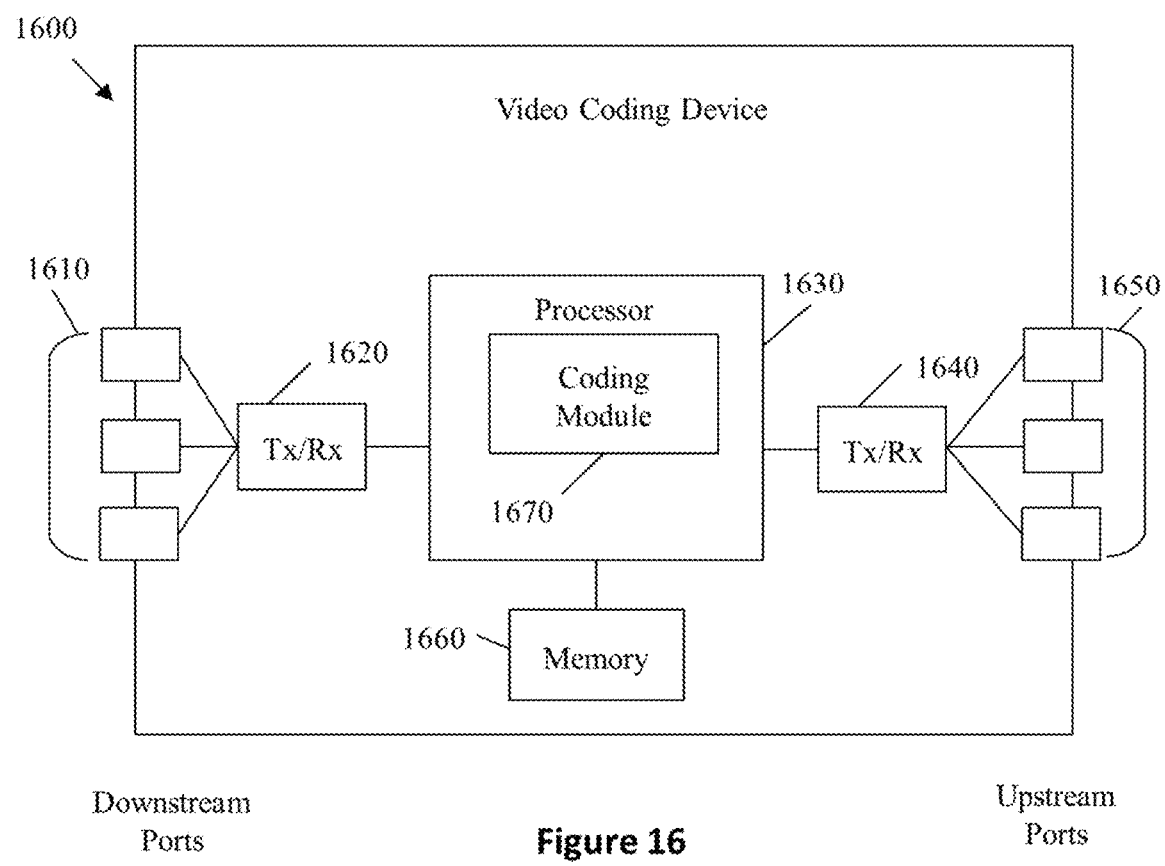
FIG. 16 is a block diagram illustrating an example of an encoding apparatus or a decoding apparatus.
Figure 17:
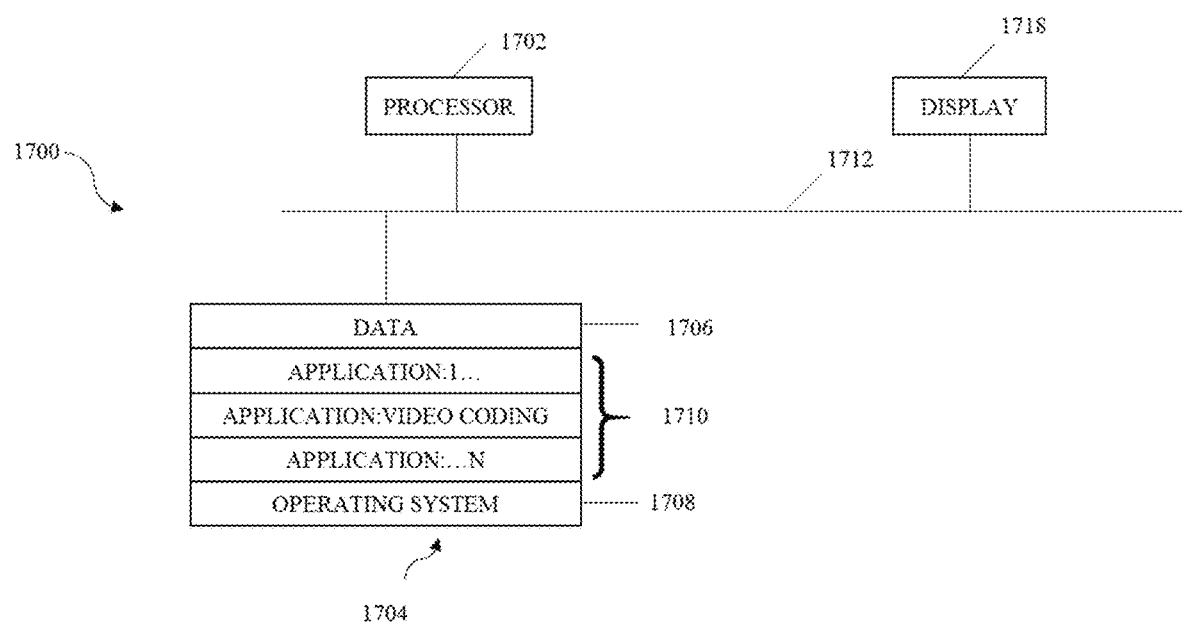
FIG. 17 is a block diagram illustrating another example of an encoding apparatus or a decoding apparatus.

In the embodiments 3.1, 3.4 and 3.5, the intra prediction modes Planar and DC are inserted in the MPM list before the entries in the historical table are considered for insertion. The general structure of the invention can be modified advantageously as below (FIG. 15), where the intra prediction modes Planar and DC are checked before insertion into the historical table. In an example, if entries in historical table are considered for insertion into MPM list after Planar and DC modes, these modes are not inserted into historical table.

According to embodiments 3.1, 3.4 and 3.5 the Planar and DC modes are known to be already included in the MPM list, it is unnecessary to consider them again for insertion into MPM list. This is achieved according to Embodiment 6 by not inserting these modes into historical table.

Implementations of the subject matter and the operations described in this disclosure may be implemented in digital electronic circuitry, or in computer software, firmware, or hardware, including the structures disclosed in this disclosure and their structural equivalents, or in combinations of one or more of them. Implementations of the subject matter described in this disclosure may be implemented as one or more computer programs, i.e., one or more modules of computer program instructions, encoded on computer storage medium for execution by, or to control the operation of, data processing apparatus. Alternatively or in addition, the program instructions may be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical and/or non-transitory components or media (for example, multiple CDs, disks, or other storage devices).

It is emphasized that the above particular examples are given for illustration only and the present disclosure as defined by the appended claims is by no means limited to these examples. For instance, in accordance with embodiments, the processing could be performed analogously, when the horizontal and vertical directions are exchanged, i.e. the "outer" loop is performed along the x direction and the "inner" loop is performed along the y direction. Further modifications are possible within the scope of the appended claims.

In summary, the present disclosure relates to an improvement of known bidirectional inter-prediction methods. According to the present disclosure, instead of interpolation from secondary reference samples, for calculating samples in intra prediction, calculation based on "primary" reference sample values only is used. The result is then refined by adding an increment which depends at least on the position of the pixel (sample) within the current block and may further depend on the shape and size of the block and the prediction direction but does not depend on any additional "secondary" reference sample values. The processing according to the present disclosure is thus less computationally complex because it uses a single interpolation procedure rather than doing it twice: for primary and secondary reference samples.

Note that this specification provides explanations for pictures (frames), but fields substitute as pictures in the case of an interlace picture signal.

Although embodiments of the disclosure have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g. partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

Wherever embodiments and the description refer to the term "memory", the term "memory" shall be understood and/or shall comprise a magnetic disk, an optical disc, a solid state drive (SSD), a read-only memory (Read-Only Memory, ROM), a random access memory (Random Access Memory, RAM), a USB flash drive, or any other suitable kind of memory, unless explicitly stated otherwise.

Wherever embodiments and the description refer to the term "network", the term "network" shall be understood and/or shall comprise any kind of wireless or wired network, such as Local Area Network (LAN), Wireless LAN (WLAN) Wide Area Network (WAN), an Ethernet, the Internet, mobile networks etc., unless explicitly stated otherwise.

The person skilled in the art will understand that the "blocks" ("units" or "modules") of the various figures (method and apparatus) represent or describe functionalities of embodiments of the disclosure (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and are not intended to limit the disclosure.

In the several embodiments provided in the present application, it should be understood that the disclosed system, apparatus, and method may be implemented in other manners. For example, the described apparatus embodiment is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

Embodiments of the disclosure may further comprise an apparatus, e.g. encoder and/or decoder, which comprises a processing circuitry configured to perform any of the methods and/or processes described herein.

Embodiments of the encoder 100 and/or decoder 200 may be implemented as hardware, firmware, software or any combination thereof. For example, the functionality of the encoder/encoding or decoder/decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Blue ray disc, DVD, CD, USB (flash) drive, hard disc, server storage available via a network, etc.

An embodiment of the disclosure comprises or is a computer program comprising program code for performing any of the methods described herein, when executed on a computer.

An embodiment of the disclosure comprises or is a computer readable medium comprising a program code that, when executed by a processor, causes a computer system to perform any of the methods described herein.

An embodiment of the disclosure comprises or is a chipset performing any of the methods described herein.

The invention claimed is:

1. A method to derive candidate intra prediction modes, comprising:
   recording an intra prediction mode of at least one previous coding unit, wherein the previous coding unit is not adjacent to a to-be-processed coding unit; and
   adding at least one recorded intra prediction mode into a set of candidate intra prediction modes based on a determination that a number of the candidate intra prediction modes included in the set of candidate intra prediction modes is less than a preset threshold,
   wherein recording the intra prediction mode of the at least one previous coding unit comprises:
   adding the intra prediction mode of the at least one previous coding unit into a historical table according to a processing order of a plurality of previous coding units comprising the at least one previous coding unit.

2. The method of claim 1, wherein the set of candidate intra prediction modes is a most probable mode (MPM) list.

3. The method of claim 2, further comprising coding, wherein for coding of the modes from the MPM list, a truncated unary binarization is used.

4. The method of claim 1, wherein the set of candidate intra prediction modes includes intra prediction modes that are not included in a most probable mode list.

5. The method of claim 4, wherein
   the candidate intra prediction modes that are not included in the most probable mode list are first divided into a set of selected modes and a set of non-selected modes, and
   the candidate intra prediction modes in the set of selected modes are signaled with a fixed-length code and the candidate intra prediction modes in the set of non-selected modes are signaled with a truncated binary code.

6. The method of claim 1, wherein the historical table is a first-in-first-out table.

7. The method of claim 1, wherein at least two entries in the historical table are different from one another.

8. The method of claim 1, wherein
   a position of an entry in the historical table is based on a frequency of the entry, and
   adding the intra prediction mode of the at least one previous coding unit into the historical table, comprises:

determining whether the intra prediction mode is in the historical table;

adding the frequency of the intra prediction mode by one, when determining that the intra prediction mode is in the historical table;

adjusting the position of the intra prediction mode, when the frequency of the intra prediction mode is higher than both of frequencies of intra prediction modes on adjacent positions;

determining whether the historical table is full, when determining that the intra prediction mode is not in the historical table;

adding the intra prediction mode after a least frequency position of the historical table and setting the frequency of the intra prediction mode as one, when determining that the historical table is not full; and replacing the entry on the least frequency position of the historical table with the intra prediction mode and setting the frequency of the intra prediction mode as one, when determining that the historical table is full.

9. The method of claim 8, wherein in the adjusting, the position of the intra mode in the historical table and an adjacent entry is exchanged.

10. The method of claim 1, wherein adding the at least one recorded intra prediction mode into the set of candidate intra prediction modes, comprises:

adding the at least one recorded intra prediction mode after the intra prediction mode of at least one adjacent coding unit of the to-be-processed coding unit so that a bit for coding indicator of the intra prediction mode of the at least one adjacent coding unit is not more than the bit for coding indicator of the at least one recorded intra prediction mode.

11. A method for encoding a current block of a picture, the method comprising:

providing a predicted block for the current block including the method for deriving candidate intra prediction modes according to claim 1 as samples of the current block and encoding the current block based on the predicted block.

12. A method for decoding a current block of a picture, the method comprising:

providing a predicted block for the current block including the method for deriving candidate intra prediction modes according to claim 1 as samples of the current block and reconstructing the current block based on the predicted block.

13. A candidate list device for deriving candidate intra prediction modes, comprising processing circuitry configured to record an intra prediction mode of at least one previous coding unit into a historical table according to the processing order of a plurality of previous coding units comprising the at least one previous coding unit, wherein the previous coding unit is not adjacent to a to-be-processed coding unit; and add at least one recorded intra prediction mode into a set of candidate intra prediction modes based on a determination that a number of the candidate intra prediction modes included in the set of candidate intra prediction modes is less than a preset threshold.

14. The device of claim 13, wherein the set of candidate intra prediction modes is a most probable mode (MPM) list, or the set of candidate intra prediction modes includes intra prediction modes that are not included in a most probable mode list.

15. The device of claim 13, wherein the historical table is a first-in-first-out table.

16. The device of claim 13, wherein at least two entries in the historical table are different from one another.

17. The device of claim 13, wherein a position of an entry in the historical table is based on a frequency of the entry, and add the intra prediction mode of the at least one previous coding unit into the historical table, comprises:

determine whether the intra prediction mode is in the historical table;

add the frequency of the intra prediction mode by one, when determining that the intra prediction mode is in the historical table;

adjust the position of the intra prediction mode, when the frequency of the intra prediction mode is higher than both of frequencies of intra prediction modes on adjacent positions;

determine whether the historical table is full, when determining that the intra prediction mode is not in the historical table;

add the intra prediction mode after a least frequency position of the historical table and setting the frequency of the intra prediction mode as one, when the historical table is not full;

replace the entry on the least frequency position of the historical table with the intra prediction mode and setting the frequency of the intra prediction mode as one, when determining that the historical table is full.

18. A decoding apparatus for decoding a current encoded block of a picture, comprising the candidate list device according to claim 13 for deriving candidate intra prediction modes, and circuitry configured to:

provide a predicted block as the encoded block using the derived intra prediction modes, and reconstruct the current block based on the encoded block and the predicted block.

* * * * *